United States Patent [19]

Daggett et al.

[11] Patent Number: 4,864,204
[45] Date of Patent: Sep. 5, 1989

[54] MULTIPROCESSOR TORQUE SERVO CONTROL FOR MULTIAXIS DIGITAL ROBOT CONTROL SYSTEM

[75] Inventors: Kenneth E. Daggett, Murrysville, Pa.; Eimei M. Onaga, Brookfield Center; Richard J. Casler, Jr., Newtown, both of Conn.

[73] Assignee: Westinghouse Electric Corp., Pittsburgh, Pa.

[21] Appl. No.: 180,601

[22] Filed: Apr. 6, 1988

Related U.S. Application Data

[63] Continuation of Ser. No. 932,977, Nov. 20, 1986, abandoned.

[51] Int. Cl.$^4$ ............................................. G06F 15/46
[52] U.S. Cl. .................. 318/568.2; 318/575; 318/567; 318/568.18; 364/513; 901/20; 901/23
[58] Field of Search ............... 318/563, 567, 568 R, 318/568 L, 568 M, 560, 565, 566, 570, 571, 572, 573, 574, 575, 576, 577; 364/478, 513, 573, 169, 167.01, 174; 901/19, 20, 22, 23, 24

[56] References Cited

U.S. PATENT DOCUMENTS

| | | | |
|---|---|---|---|
| 3,970,830 | 7/1976 | White et al. | 364/131 X |
| 4,068,156 | 1/1978 | Johnson et al. | 318/575 |
| 4,308,584 | 12/1981 | Arai | 364/513 |
| 4,467,436 | 8/1984 | Chance et al. | 364/513 |
| 4,503,507 | 3/1985 | Takeda et al. | 364/131 X |
| 4,514,814 | 4/1985 | Evans | 364/132 X |
| 4,523,135 | 6/1985 | Kogawa | 318/565 |
| 4,543,639 | 9/1985 | Inaba et al. | 364/513 |
| 4,549,276 | 10/1985 | Inaba et al. | 364/513 |
| 4,580,207 | 1/1986 | Arai et al. | 364/138 |
| 4,587,605 | 5/1986 | Kouyama et al. | 364/131 X |
| 4,598,380 | 7/1986 | Holmes et al. | 364/167.01 X |
| 4,611,296 | 9/1986 | Niedermayr | 364/138 X |
| 4,623,971 | 11/1986 | Ailman et al. | 364/513 |
| 4,629,955 | 12/1986 | French et al. | 364/167.01 X |
| 4,631,689 | 12/1986 | Arimura et al. | 364/513 |
| 4,663,730 | 5/1987 | Ikeda | 364/132 X |
| 4,675,803 | 6/1987 | Kendall et al. | 364/131 |
| 4,677,433 | 6/1987 | Catlin et al. | 364/131 X |
| 4,682,089 | 7/1977 | Tamari | 318/565 X |
| 4,698,777 | 10/1987 | Toyoda et al. | 364/513 |
| 4,718,078 | 1/1988 | Bleidorn et al. | 364/513 X |

Primary Examiner—William M. Shoop, Jr.
Assistant Examiner—Paul Ip
Attorney, Agent, or Firm—J. L. Brzuszek

[57] ABSTRACT

A digital robot control is provided with cascaded position/velocity and torque control loops with microprocessor servo controllers in each. The servo controller includes two microprocessors that operate as a servo engine in providing motion control for six robot axes. One microprocessor is structured to perform data processing and coordination tasks. The other one performs calculation tasks and operates as a slave processor to the first.

10 Claims, 34 Drawing Sheets

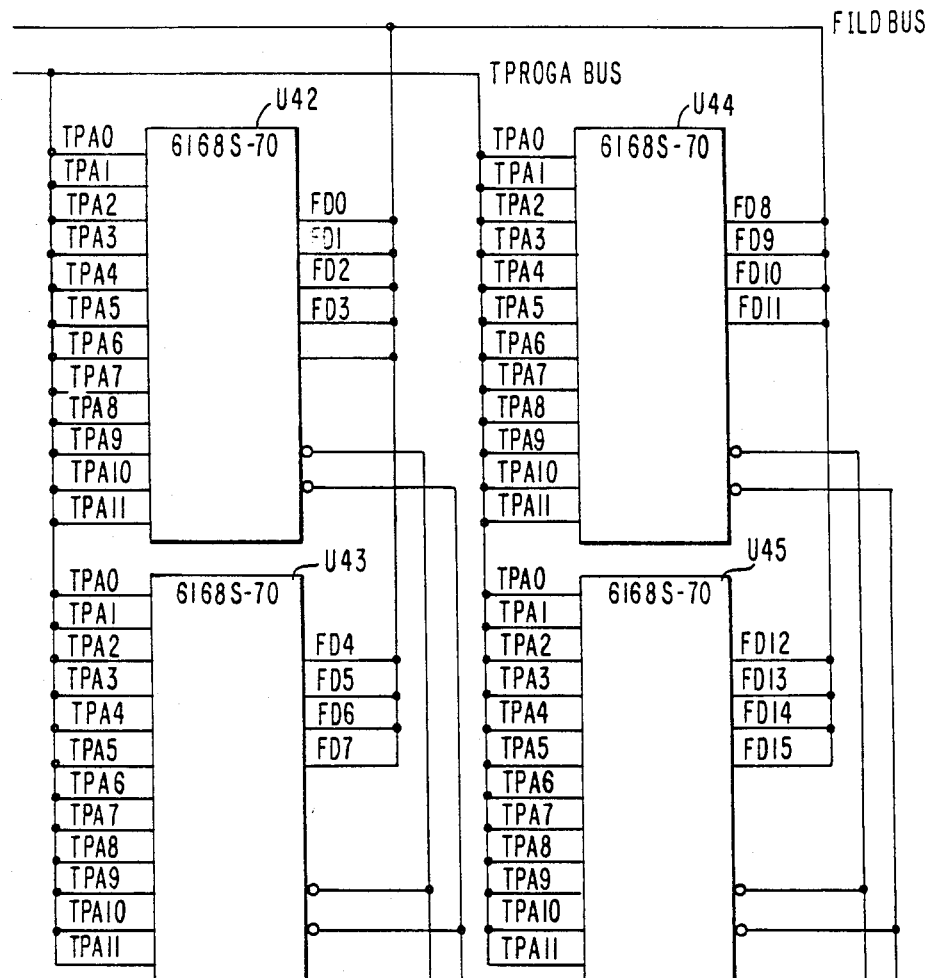
FIG.9D-2
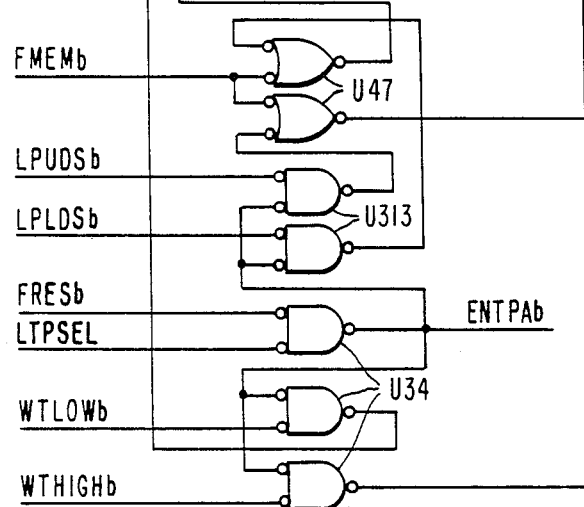

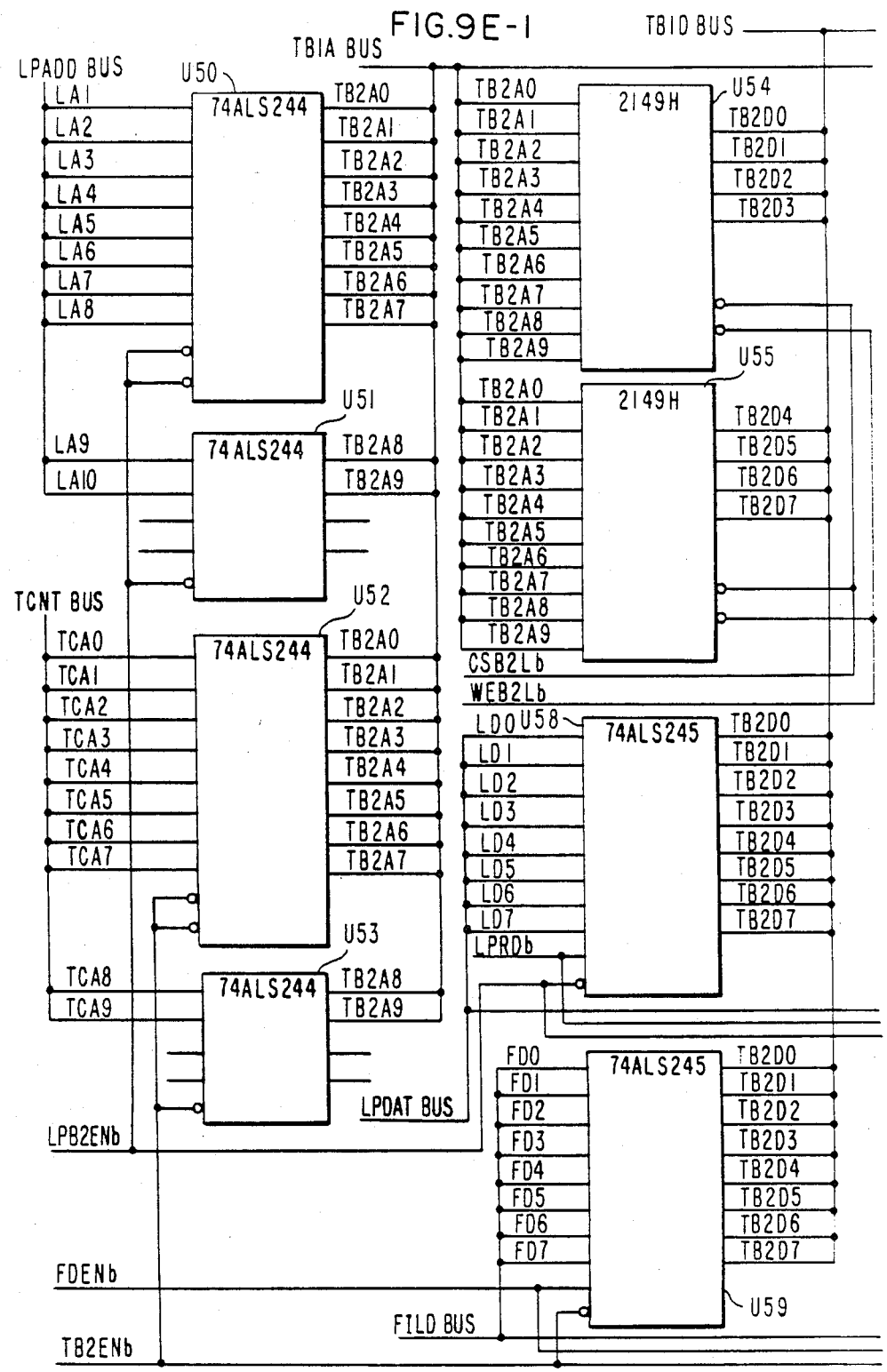

MULTIPROCESSOR TORQUE SERVO CONTROL FOR MULTIAXIS DIGITAL ROBOT CONTROL SYSTEM

This application is a continuation of application Ser. No. 932,977 filed Nov. 20, 1986, now abandoned.

CROSS REFERENCE TO RELATED APPLICATIONS

The following concurrently filed patent applications, each filed on Nov. 20, 1986, are related to the disclosure of the present application, assigned to the present assignee and are hereby incorporated by reference:

U.S. Ser. No. 932,975 (W.E. Case 53,224) entitled DIGITAL ROBOT CONTROL HAVING AN IMPROVED CURRENT SENSING SYSTEM FOR POWER AMPLIFIERS IN A DIGITAL ROBOT CONTROL and filed by Kenneth E. Daggett, Leonard C. Vercellotti, Richard A. Johnson, Richard J. Casler and Eimei Onaga.

U.S. Ser. No. 932,841 (W.E. Case 53,225) entitled DIGITAL ROBOT CONTROL HAVING AN IMPROVED PULSE WIDTH MODULATOR and filed by Kenneth E. Daggett.

U.S. Ser. No. 932,992 (W.E. Case 53,226) entitled COMMUNICATION INTERFACE FOR MULTI-MICROPROCESSOR SERVO CONTROL IN A MULTI-AXIS ROBOT CONTROL SYSTEM and filed by Kenneth E. Daggett.

U.S. Pat. No. 4,763,055 (W.E. Case 53,227) entitled DIGITAL ROBOT CONTROL HAVING HIGH PERFORMANCE SERVO CONTROL SYSTEM and filed by Kenneth E. Daggett, Richard J. Casler and Eimei Onaga.

U.S. Ser. No. 932,974 (W.E. Case 53,367) entitled DIGITAL ROBOT CONTROL PROVIDING PULSE WIDTH MODULATION FOR A BRUSHLESS DC DRIVE and filed by Kenneth E. Daggett, Richard A. Johnson, Eimei Onaga and Richard J. Casler.

U.S. Ser. No. 932,853 (W.E. Case 53,368) entitled IMPROVED POSITION AND VELOCITY FEEDBACK SYSTEM FOR A DIGITAL ROBOT CONTROL and filed by Kenneth E. Daggett, Richard J. Casler and Eimei Onaga.

U.S. Ser. No. 932,982 (W.E. Case 53,369) entitled UNIVERSAL ROBOT CONTROL BOARD CONFIGURATION and filed by Richard J. Casler, Eimei Onaga, Vincent P. Jalbert, Barrett Booth, and Kenneth E. Daggett.

U.S. Ser. No. 932,991 (W.E. Case 53,372) entitled BASIC DIGITAL MULTI-AXIS ROBOT CONTROL HAVING MODULAR PERFORMANCE EXPANSION CAPABILITY and filed by Kenneth E. Daggett, Barrett Booth, Eimei Onaga and Richard J. Casler.

U.S. Pat. No. 4,786,847 (W.E. Case 53,373) entitled IMPROVED DIGITAL CONTROL FOR MULTIAXIS ROBOTS and filed by Kenneth E. Daggett, Richard J. Casler, Eimei Onaga, Barrett Booth, Rajan Penkar, Leonard C. Vercellotti and Richard A. Johnson.

U.S. Ser. No. 932,983 (W.E. Case 53,374) entitled MODULAR ROBOT CONTROL SYSTEM and filed by Kenneth E. Daggett, Barrett Booth, Vincent P. Jalbert, Eimei Onaga and Richard J. Casler.

U.S. Ser. No. 932,990 (W.E. Case 53,424) entitled MULTIPROCESSOR POSITION/VELOCITY SERVO CONTROL FOR MULTIAXIS DIGITAL ROBOT CONTROL SYSTEM and filed by R. Lancraft, Eimei Onaga, Richard J. Casler, Kenneth E. Daggett and Barrett Booth.

U.S. Pat. No. 4,829,219 (W.E. Case 53,489) entitled MULTIAXIS ROBOT HAVING IMPROVED MOTION CONTROL THROUGH VARIABLE ACCELERATION/DECELERATION PROFILING and filed by Rajan Penkar.

U.S. Pat. No. 4,774,445 (W.E. Case 53,490) entitled MULTIAXIS ROBOT CONTROL HAVING CAPABILITY FOR EXECUTING TIMED MOVES and filed by Rajan Penkar.

U.S. Pat. No. 4,772,831 (W.E. Case 53,491) entitled MULTIAXIS ROBOT CONTROL HAVING IMPROVED CONTINUOUS PATH OPERATION and filed by Rajan Penkar.

U.S. Pat. No. 4,773,025 (W.E. Case 53,492) entitled MULTIAXIS ROBOT CONTROL HAVING FITTED CURVED PATH CONTROL and filed by Rajan Penkar.

U.S. Ser. No. 932,973 (W.E. Case 53,493) entitled MULTIAXIS ROBOT CONTROL HAVING IMPROVED ENERGY MONITORING SYSTEM FOR PROTECTING ROBOTS AGAINST JOINT MOTOR OVERLOAD and filed by Eimei Onaga.

U.S. Pat. No. 4,807,153 (W.E. Case 53,494) entitled MULTIAXIS DIGITAL ROBOT CONTROL HAVING A BACKUP VELOCITY MONITOR AND PROTECTION SYSTEM and filed by Eimei Onaga.

BACKGROUND OF THE INVENTION

The present invention relates to robots and more particularly to digital robot control systems and servo controls that are operated in torque control loops in such systems.

In the referenced patent applications, there is disclosed a new economic, high performance digital control system for multiaxis robots. In that digital control system, a multiprocessor servo control having uniquely combined microprocessors provides extended control capacity and performance for multiaxis robot control applications. Reference is made specifically to W.E. 53,227 which pertains to the multiprocessor servo control generally.

The multiprocessor servo control can be embodied differently to function in different control loops. Reference is made to W.E. 53,424 which pertains to a position/velocity multiprocessor servo control. The present invention is directed to a multiprocessor servo control that is structured to provide torque control in a multiaxis digital robot control system.

SUMMARY OF THE INVENTION

A robot arm has a plurality of motor driven joints energized by respective power amplifiers. Respective feedback control loop means control the power amplifiers. Each of the feedback control loop means includes at least digital position and velocity control loops and at least one servo control means is provided for performing control support tasks and calculation tasks in at least one of the control loops for all of the joint motors. The first servo control means includes a first microprocessor for performing calculation tasks including computing output control commands from stored algorithms for the one control loop for each joint motor;

A second microprocessor supervises the operation of the first servo control means and performs servo control support tasks in the one control loop for each joint motor including the routing of control command, status and feedback data to and from the first microprocessor.

The first microprocessor has a relatively high computing performance capability and a relatively low data processing interface capability, and the second microprocessor has a relatively high data processing capability.

Communication interfacing is provided for the first and second microprocessors relative to each other and relative to higher and lower level control circuitry so as to enable the servo control means to operate the one control loop for each joint motor and control the controlled variable for the one control loop.

BRIEF DESCRIPTION OF THE DRAWINGS

FIGS. 6A-1 and 6A-2 show a broad schematic diagram of a torque processor electronic board on which the torque servo control of FIG. 5 is embodied in a commercial implementation of the invention;

FIGS. 7A to 7E, and 7F-1 to 7F-4 show schematic flow charts of programming for microprocessors employed in the torque servo control of FIG. 5;

FIGS. 9A-1 to 9H-2 show more detailed circuit diagrams of the torque processor board.

DESCRIPTION OF THE PREFERRED EMBODIMENT

ROBOTS—GENERALLY

Robot capabilities generally range from simple repetitive point-to-point motions to complex motions that are computer controlled and sequenced as part of an integrated manufacturing system. In factory applications, robots can perform a wide variety of tasks in various manufacturing applications including: die casting, spot welding, arc welding, investment casting, forging, press working, spray painting, plastic molding, machine tool loading, heat treatment, metal deburring, palletizing, brick manufacturing, glass manufacturing, etc. For more complete consideration of robots and their uses, reference is made to a book entitled "Robotics In Practice" published in 1980 by Joseph F. Engelberger.

To perform work within its sphere of influence, a robot typically is provided with an arm, a wrist subassembly and an end effector. The coordinate system employed for the robot arm typically is Cartesian, cylindrical, polar or revolute. Generally, three motion axes are employed to deliver the wrist subassembly anywhere within the sphere of influence and three additional motion axes are employed for universal orientation of the end effector. A drive system is used for each motion axis, and it may be electrical, hydraulic or pneumatic.

PUMA ROBOT

Figure 1:
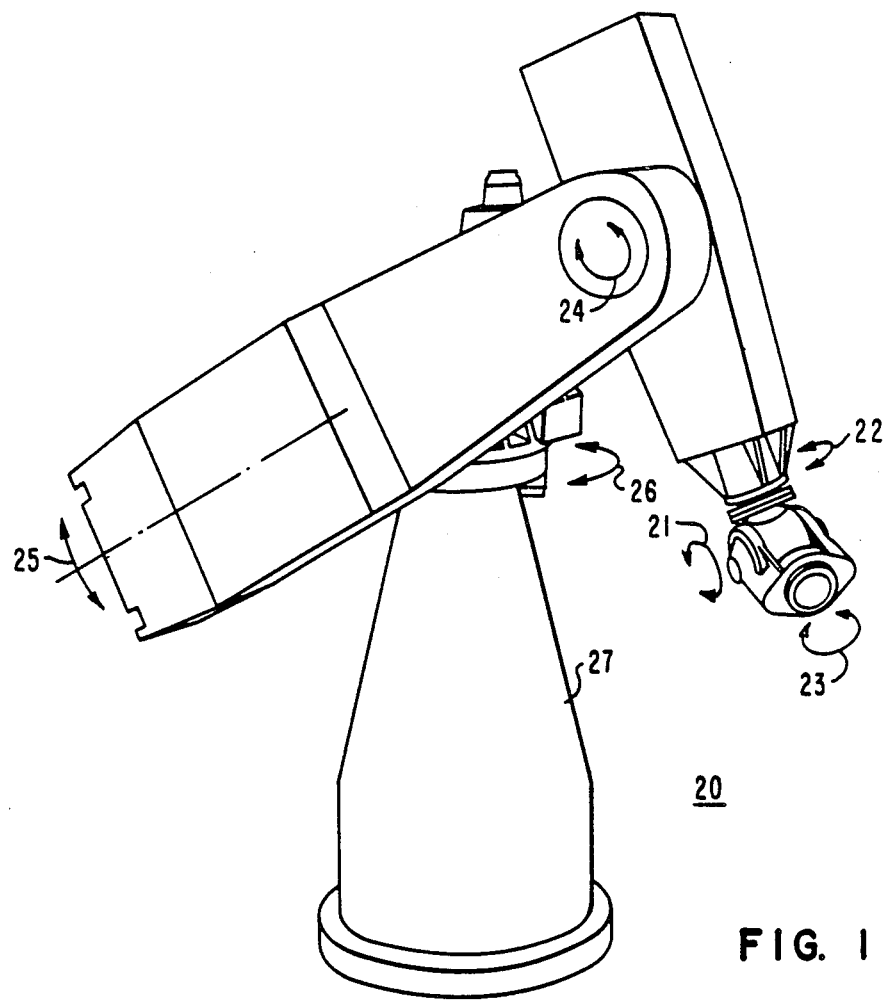
FIG. 1 shows a perspective view of a robot which is operated with more advanced and more accurate performance when controlled by a system making use of the invention.

More particularly, there is shown in FIG. 1 a six-axis industrial electric robot 20 which is illustrative of a wide variety of robots that can be operated in accordance with the principles of the invention. The robot 20 is a relatively powerful electric robot sold by Unimation Company, a wholly-owned company of the present assignee, under the trade name UNIMATE PUMA SERIES 700. The Model 761 PUMA has a 22 pound payload capacity and a reach of 59.1 inches. The Model 762 PUMA has a 44 pound payload capacity and a reach of 49.2 inches.

PUMA 700 Series robots are designed with flexibility and durability to ensure long life and optimum performance in even the harshest, most demanding manufacturing environments. Specific customer needs for either higher payload or extended reach determine which model is suitable for a particular task.

With its longer reach, the PUMA 761 is ideally suited for precise, repetitive tasks such as arc welding and sealant dispensing. The PUMA 762 performs high-precision material handling, machine loading, inspection, testing, joining and assembly in medium and heavier weight applications. The PUMA robots occupy minimal floor space, yet a large work envelope allows the robots to service multiple machines and work surfaces.

Each axis motion is generated by a brush type DC electric motor, with axis position feedback generated by incremental encoders. As shown, the wrist is provided with three articulations, i.e., an up/down rotation indicated by arrow 21 and a left/right rotation indicated by arrow 22 and a third arm motion indicated by arrow 23. Elbow and shoulder rotations in the up/down direction are respectively indicated by arrows 24 and 25. Finally, a left/right arm rotation on a base 27 is indicated by arrow 26.

ROBOT CONTROL

The present invention relates to a robot control (FIGS. 2, 3A, or 4) which can operate the robot 20 of FIG. 1 and other robots including the larger Unimation 860 robot which employs brushless DC axis motors and absolute position feedback. Generally, however, the robot control 30 is universally and flexibly applicable to differing kinds and sizes of robots in stand alone or robotic network operation.

As a result of its universality, the control 30 can be arranged to operate a complete family of robots. Thus, all hydraulically and electrically driven robot arms manufactured by Unimation, a company of Westinghouse, assignee of the present invention, can be operated by the control 30. The key to the family usage, or more generally the universality of the control 30 lies in modularization and in minimizing the use of arm dependent hardware and avoiding the use of any arm dependent hardware in as much of the modular control structure as possible. The robot control 30 is identified by the acronym UNIVAL and operates with completely digital servo control to provide better robot performance with lower cost.

CONTROL LOOPS

Figure 2:
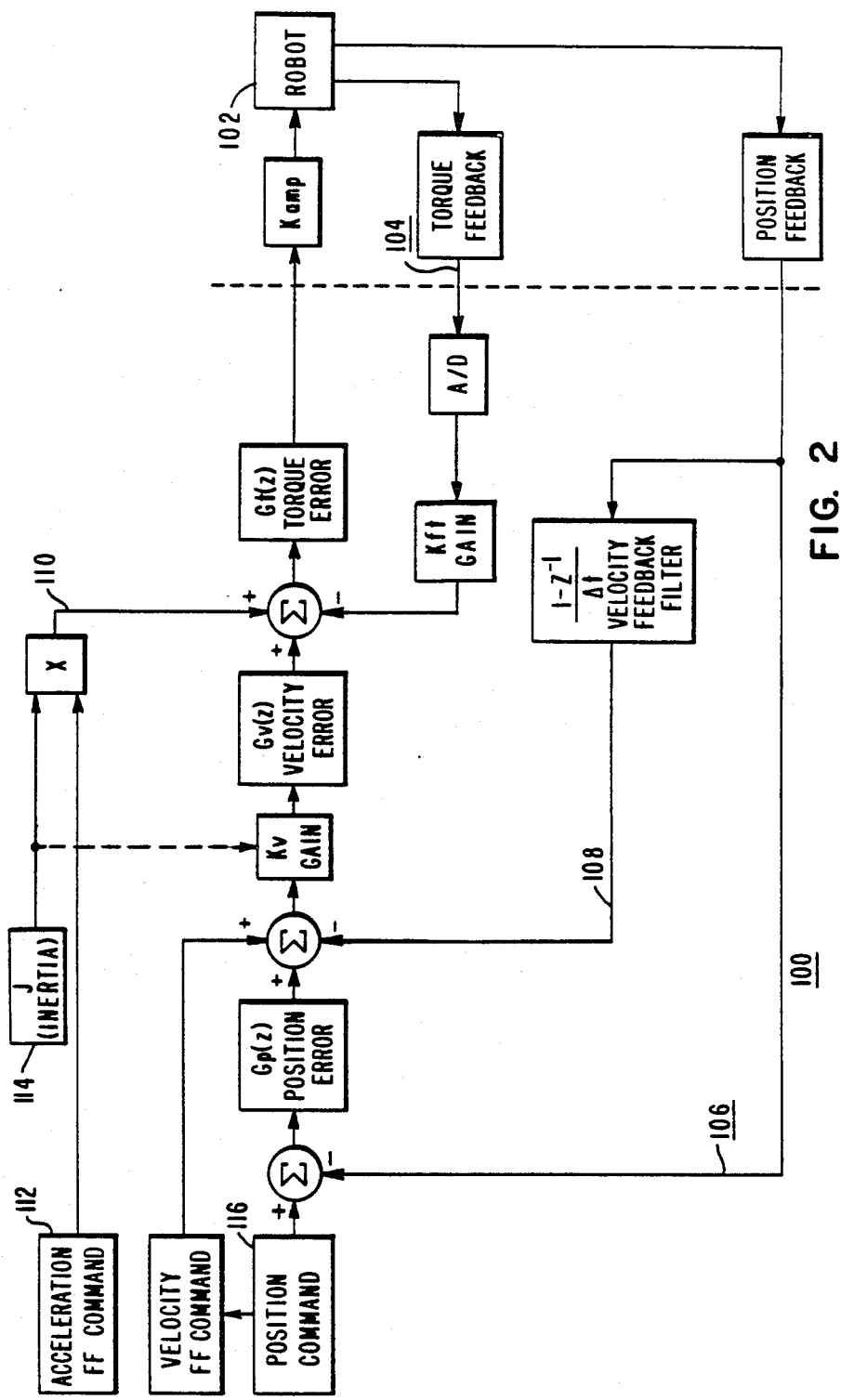
FIG. 2 shows a generalized block diagram of a control loop arrangement employing position, velocity and torque control loops in which the invention may be embodied.

In FIG. 2, there is shown an embodiment of a generalized control loop configuration 100 employable in the UNIVAL TM robot control. Thus, each robot arm joint motor 102 is operated by a torque control loop 104. An outer position control loop 106 is tandem connected to a velocity control loop 108 which in turn drives the torque control loop 104. A feedforward acceleration control loop 110 is responsive to acceleration command 112 and arm and load inertia 114 is also directly coupled to the input of the torque control loop 104. The robot arm is operated by the control loop 100 in accordance with a robot program through a stream of program position commands 116 applied to the position control loop.

Figure 3A:
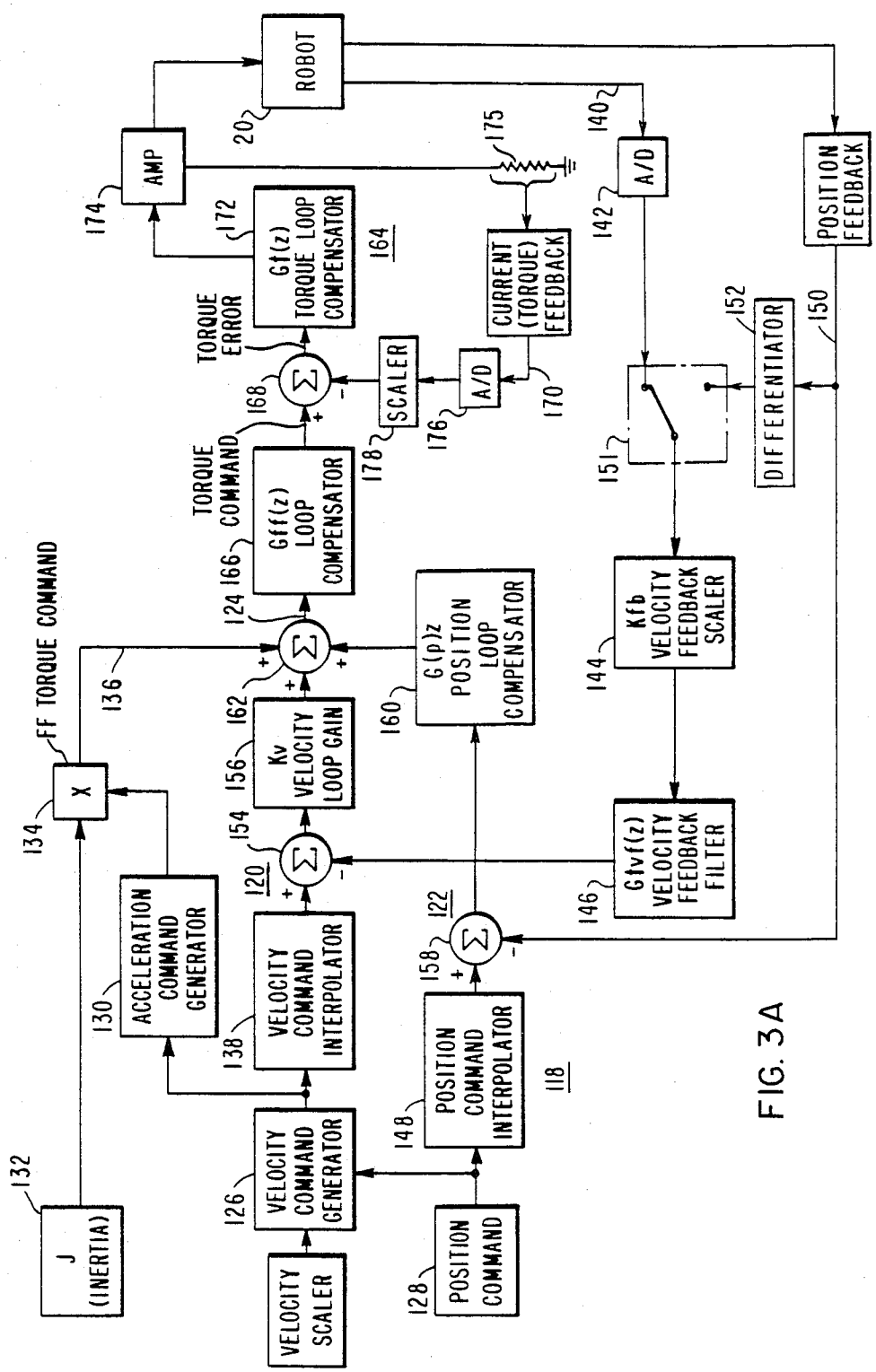
FIG. 3A shows a more detailed block diagrams of a control loop arrangement employing position, velocity and torque control loops in which the invention preferably is embodied.

FIG. 3A shows the preferred generalized control loop configuration 118 presently employed in the UNIVAL robot control. It is preferably implemented as a completely digital control. With the provision of hierarchical architecture and multiprocessor architecture and floating point hardware as described herein or in other patent applications referenced above, the trajectory cycle can be characterized with a cycle time in the range of 32 to 8 milliseconds depending on the employed modular configuration.

In the preferred control loop arrangement 118, control loop 122 and velocity control loop 120 are parallel fed to the input of a torque control loop 124. Velocity commands are generated by block 126 from position commands received by block 128. In turn, feedforward acceleration commands are generated by block 130 from the velocity commands. Computed inertia (load and arm) 132 is multiplied against the acceleration command as indicated by reference character 134 in the feedforward acceleration control loop 136.

In the velocity loop 120, the velocity command in the present embodiment is generated once every 8 to 32 milliseconds depending on the modular configuration of the robot control. The basic robot control described subsequently herein has a trajectory cycle time of 32 milliseconds while the enhanced contact has a trajectory cycle of 8 milliseconds.

In any case, a velocity command generator 126 interpolates velocity commands at the rate of 1 each millisecond which corresponds with the velocity feedback sampling rate in velocity feedback path 140. As shown, velocity feedback for a Unimation 860 robot is produced by tachometer signals which are converted from analog to digital by converter 142. A scaler 144 and a filter 146 supplement the velocity feedback circuitry.

Similarly, in the position control loop 122, an interpolator 148 generates position commands every millisecond in correspondence with the position feedback sampling rate in feedback path 150. In the Unimation 860 robot control, position feedback is absolute and the velocity and position feedback paths 140 and 150 operate as just described (with switch 151 as shown). For Unimation PUMA robots, tachometers are not available and velocity feedback is computed from incremental position feedback as indicated by block 152 (with the switch 151 swinging to its other position) as described more fully in referenced applications W.E. 53,424 and W.E. 53,368.

Velocity error is generated by summer 154 with gain applied by loop 156. Similarly, position error is generated by summer 158 with gain applied by box 160.

Velocity and position errors and feedforward acceleration command are summed in summer 162. Gain is applied in box 166 to generate a torque command which is applied to the input of torque control loop 164 every millisecond. Torque error is generated in summer 168 by summing the torque command (motor current command) with current feedback from feedback path 170. Box 172 applies a torque loop gain to the torque error (motor voltage commands) and pulse width modulated (PWM) signals are applied to a power amplifier 174 which supplies the motor drive current for robot joint operation. Current feedback from resistor 175 is sampled every 250 microseconds (see referenced patent application W.E. 53,424) and converted to digital signals by box 176 with scaling applied by box 178.

Figure 3B:
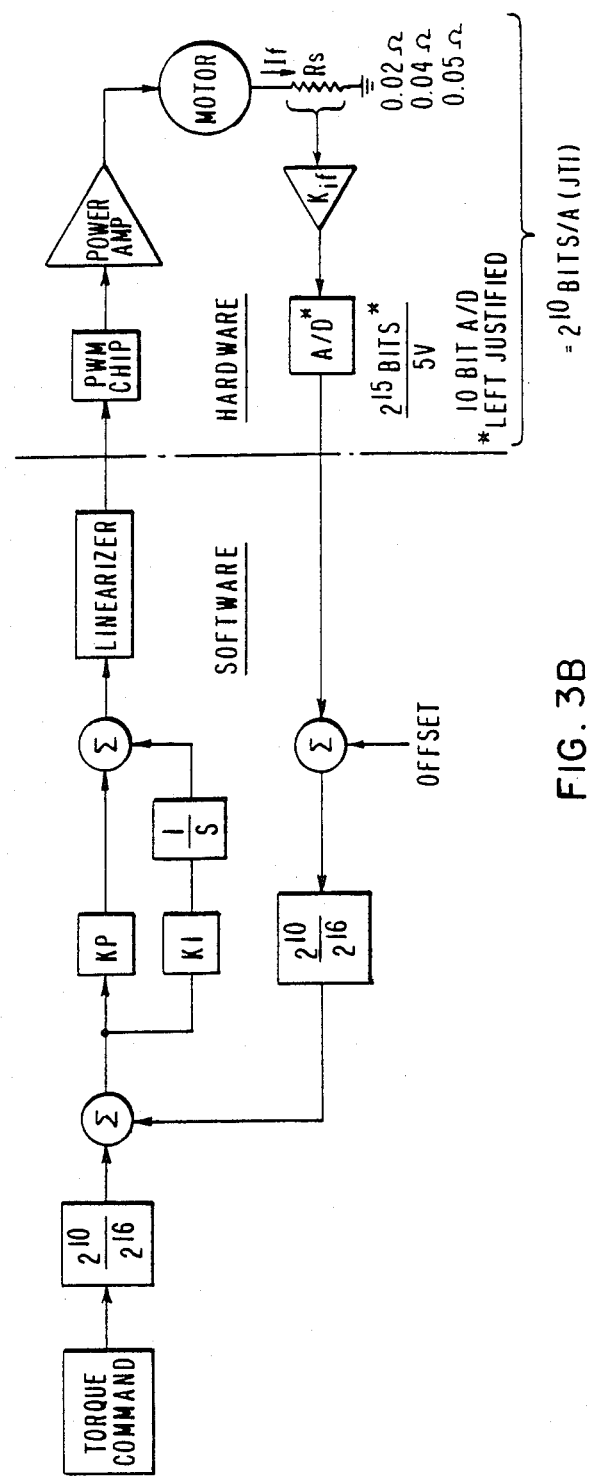
FIG. 3B shows a diagram of a torque control loop portion of the control loop arrangement.
Figure 7A:
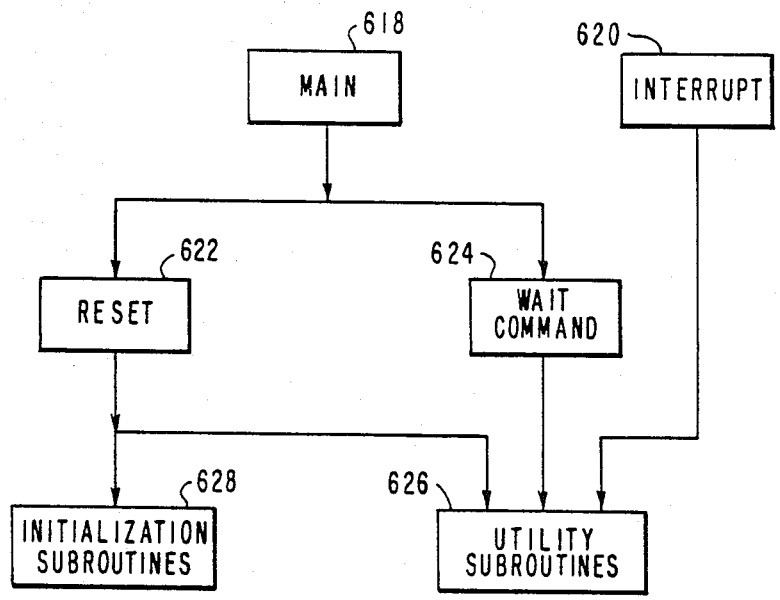
Figure 7B:
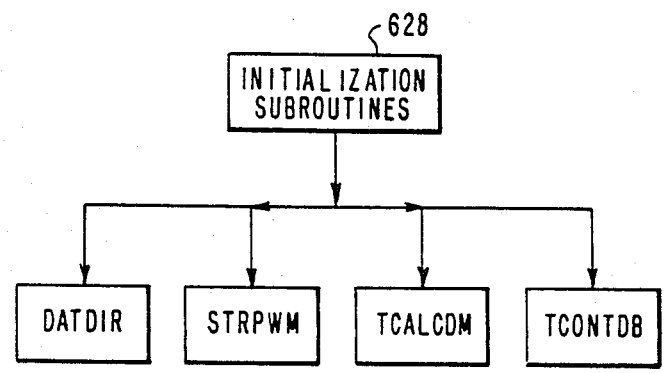

FIG. 3B shows a more specific diagram of the control loop arrangement and reference is made to W.E. 53,373 for a description of it in FIG. 7B-1 therein.

OVERVIEW—ELECTRONIC BOARDS

Implementation of the control looping for the robot control 30 is achieved by the use of digital control circuitry disposed on a plurality of electronic boards. The organization of the circuitry on the boards and the partitioning of programming among various microprocessors enables advanced robot control performance to be achieved with a modular control configuration characterized with economy of manufacture, facilitates variability of configuration which enables universality of use, and flexibility in choice of level of control performance.

Figure 4:
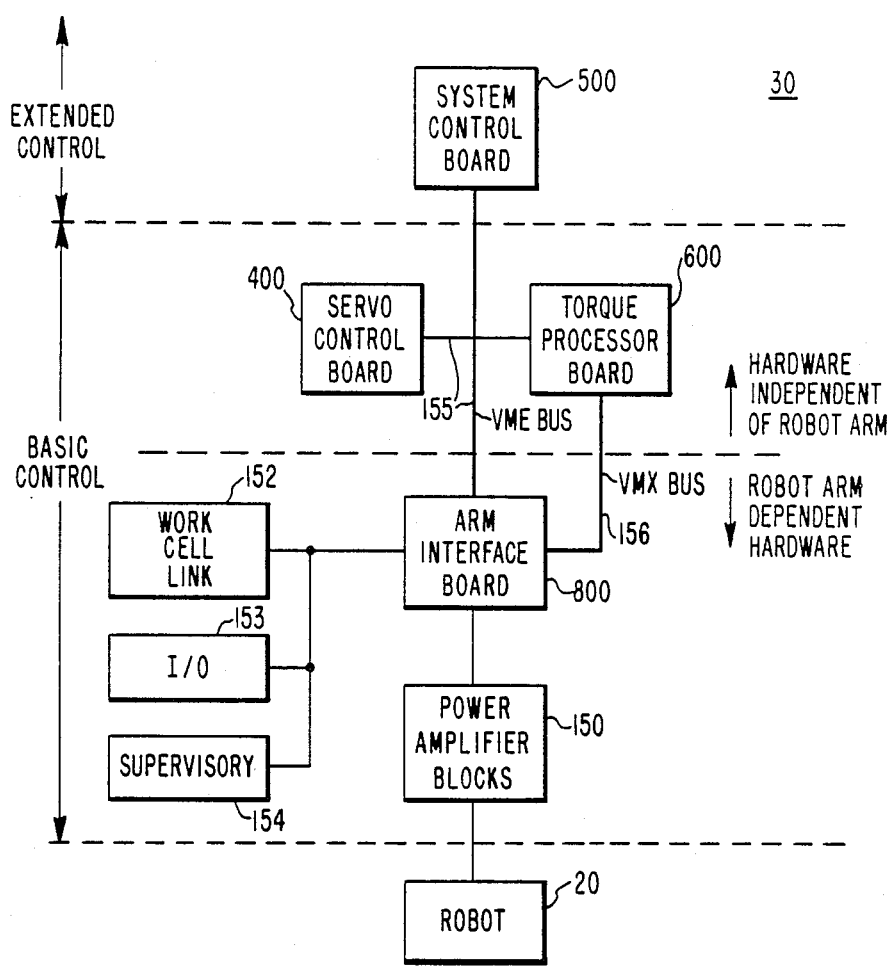
FIG. 4 shows an overview of an arrangement of electronic boards on which circuitry is arranged to implement the robot control system including the multiprocessor torque servo control of the present invention.

As shown in FIG. 4, the control board configuration includes an arm interface board 800 which preferably houses all circuitry dependent on the type of robot arm being controlled. For example, position feedback circuitry will differ according to whether absolute or incremental position feedback is used by the robot arm to be controlled. Thus, two or possibly more varieties of the arm interface board 800 can be employed to provide digital control systems for any of a variety of different sizes or types of robot arms. Any particular robot arm would require use of the arm interface board which is structured to work with that robot arm.

The arm interface (AIF) board 800 also houses generic circuitry such as VME bus control circuitry which is generally related to two or more boards and not to any one board in particular.

Control signals (pulse width modulated) are generated from the AIF board 800 to control power amplifier blocks 150 which supply motor currents to the robot joint motors. The AIF board 800 also operates as a channel for external coupling of the robot control 30 to other robot controls in a work cell as indicated by the reference character 152, to programmable controllers and other input/output devices 153 in an area network and to higher level computers 154 for supervisory control.

A torque processor (TP) board 600 and a servo control board 400 are generic circuit boards used with the AIF board 800 and power amplifier blocks 150 in all robot control systems for all robot types. The three circuit boards 400, 600 and 800 provide complete 6 axis control for a robot arm and thus form a basic control configuration for the UNIVAL family of robot controls as well as other robot controls.

The torque processor board 600 provides motor torque control in response to commands from the servo control board 400. In turn, the servo control board 400 provides arm solutions and position and velocity control in accordance with a robot control program.

Extended control capability and/or system functioning is achieved by interconnecting additional electronic boards or devices to the basic control 400, 600, 800. For example, with the addition of a system control board 500 and partitioning of predetermined program functions including the arm solutions from the servo control board 400 to the system control board 500, the UNIVAL control can operate the robot 20 and other robots with significantly faster control action, i.e., with a trajectory cycle shortened from thirty-two milliseconds to eight milliseconds.

Interboard data communications for control and other purposes occur over multiple signal paths in a VME bus 155. Additionally, a VMX bus 156 is provided for connection between the torque processor board 600 and the AIF board 800.

Multiple pin interconnectors (not shown in FIG. 4) are provided on the AIF, TP and SCM boards and any other connectable units to facilitate VME and VMX interboard bus connections modular and board assembly for the robot control 30. Other connectors are provided on the AIF board 800 for external input/output connections.

More detail on the board circuit structure is presented herein or elsewhere in the writeups for the cross-referenced patent appliations.

OVERVIEW OF TORQUE SERVO CONTROL SYSTEM AND SERVO PROCESSING ENGINE

Figure 5:
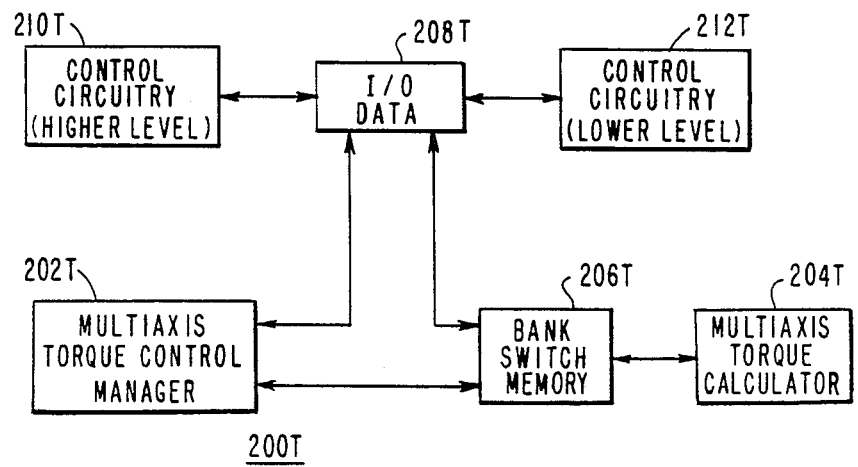
FIG. 5 shows a schematic block diagram of a multiprocessor torque servo control in accordance with the invention.

The basic structure of a multiprocessor servo control system 200T for application torque control in accordance with the invention is illustrated in FIG. 5. Multiaxis torque servo control is provided by the joint operation of two microprocessors; specifically, a multiaxis torque control manager 202T generally performs data handling functions while a multiaxis digital signal processor or torque calculator 204T generally performs torque control and other computing functions in a slave capacity relative to the torque manager 202T. A bank switched or ping-pong memory 206T interfaces the two microprocessors. Input/output data 208T, including incoming commands and outgoing commands, are received from higher level control circuitry 210T or sent to lower level control circuitry 212T.

In general, microprocessors based on the conventional Von Neumann computer architecture provide the necessary processing capability for performance of the control support and data handling tasks associated with advanced multi-axis robot controls. However, the mathematical processing capability of the Von Neumann type microprocessor is generally inadequate to provide servo control in a single microprocessor for robot control having six axes.

On the other hand, specialized computer architectures have been developed for microprocessors intended for digital signal processing applications. These microprocessors generally have a high speed, fixed point mathematical processing capability which is more than adequate for the numerical calculations required for implementing advanced servo control algorithms in multi-axis robot controls. However, the signal processors are generally lacking in control task support and data handling capabilities.

Accordingly, in implementing the present invention, the two basic microprocessor types are paired together in a multiprocessor architecture. The teamed microprocessors function as a coordinated torque control unit or servo processing "engine" and thereby enable a multiaxis robot control to provide significantly improved robot performance with control unit manufacturing economy.

Generally, the microprocessors 202T and 204T are tightly coupled within the multiprocessor architecture, and the torque calculator 204T operates as a slave peripheral device to the torque control manager 202T. Coordination of the servo engine is provided by software control in the torque control manager 202T through the interface 206T. Thus, upward and downward data communications to circuitry 210T and 212T are placed under supervisory computer control.

Preferably, two interface paths are provided between the two microprocessors. One interface path enables the manager 202T to specify slave processor execution functions. The other interface path is used for commands, status and data, i.e., to command execution of selected slave functions, to provide data to be used in execution of the function, and to return status and data results produced as a result of execution.

A Motorola 68000 device may be employed for the torque control manager 202T and a Texas Instruments TMS 320 device may be employed for the torque calculator 204T.

The TMS 320 processor 204T uses a modified "Harvard" architecture for speed and flexibility. In a strict Harvard architecture, program and data memory lie in two separate spaces, permitting a full overlap of instruction fetch and execution. The modified Harvard architecture in the TMS 320 allows transfers between program and data spaces, thereby increasing the flexibility of the device.

High speed fixed point computational capability is provided by the TMS 320 since it uses internal hardware to implement functions typically implemented by software or microprogrammed firmware in other processors. For example, the TMS 320 contains a hardware multiplier that performs a 16×16 bit multiplication in 200 nanoseconds. Further, a hardware barrel shifter shifts data on its way into the ALU so that data alignment and multiplication can be performed in a single instruction.

Since the TMS 320 is primarily intended for use in stand alone applications, its external interface capability is limited. Thus, the TMS program memory or I/O operations cannot easily be suspended to allow concurrent access by the controlling torque control (manager 202T). Thus, special interfacing circuitry is needed and it is provided in the form of the bank switched memory 26T which meets the special needs of the invention embodiment disclosed herein and can be used in other multiprocessor applications. Reference is made to co-pending patent application W.E. 53,226 for more information on the bank switched memory.

TORQUE PROCESSOR BOARD CONCEPTS

The torque processor (TP) board 600 provides a functional interface to the robot joint drive motors. Functionally, the TP board 600 implements the lowest level of control in the hierarchical control system, providing closed loop servo torque control for six robot axes. Physically, the TP board 600 electrically interfaces the robot path planning control system and the servo control (SCM) board with the arm interface (AIF) board 800, which in turn interfaces to the robot joint drive motors. The primary function of the TP board 600 is to regulate robot joint motor currents to commanded values by modulating motor winding voltages using a pulse width modulation scheme.

The TP board 600 interfaces at one level to the SCM board and accepts from the SCM board torque commands and servo parameters for six axes and returns status data. The TP board 600 interfaces at a second lower level to the AIF board 800 providing servo voltage commands for the six robot axes. The AIF board 800 receives drive motor current, position and velocity feedback for closed loop control on the SCM and TP boards.

The TP microprocessors used in the specific embodiment are the Motorola 68000 (16-bit microprocessor operating at 10.0 Mhz system clock frequency), and the TI TMS-320 Signal Processor.

The TP board 600 provides a number of features including the following:
1. Torque loop control for six aces (250 micro sec per 6 axes) for brush and brushless motors;
2. Software adjustable current offset-eliminates potentiometers;
3. Downloadable gains-arm dependent parameters can be downloaded from the SCM board;
4. PWM compensation;
5. Commutation compensation;
6. Current averaging for data logging and other purposes;
7. Current limit check;
8. Velocity monitoring (back emf) for safety check;
9. Energy check (IIT) to test stall condition;
10. Power-up self diagnostics; and
11. Downloadable diagnostics system.

TORQUE PROCESSOR BOARD

More advanced robot performance is produced by controlling the torque applied at the arm workpoint when the arm is in motion to control the arm workpoint position in accordance with a command trajectory. Thus, axis drive forces are adjusted in accordance with actually experienced workpiece loading to satisfy position and trajectory commands with greater speed, accuracy and efficiency.

Figures 1, 6A:
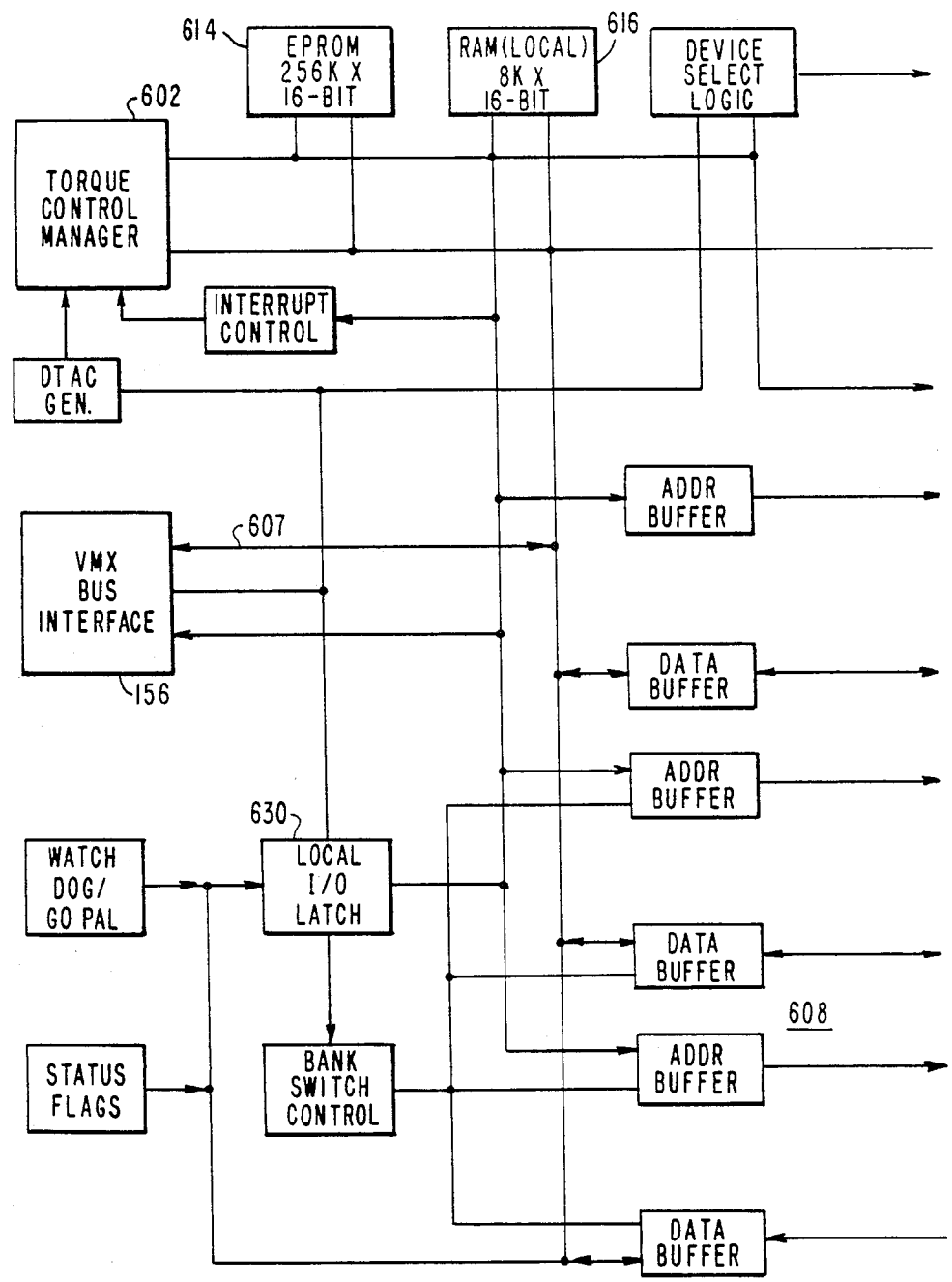
Figures 2, 6A:
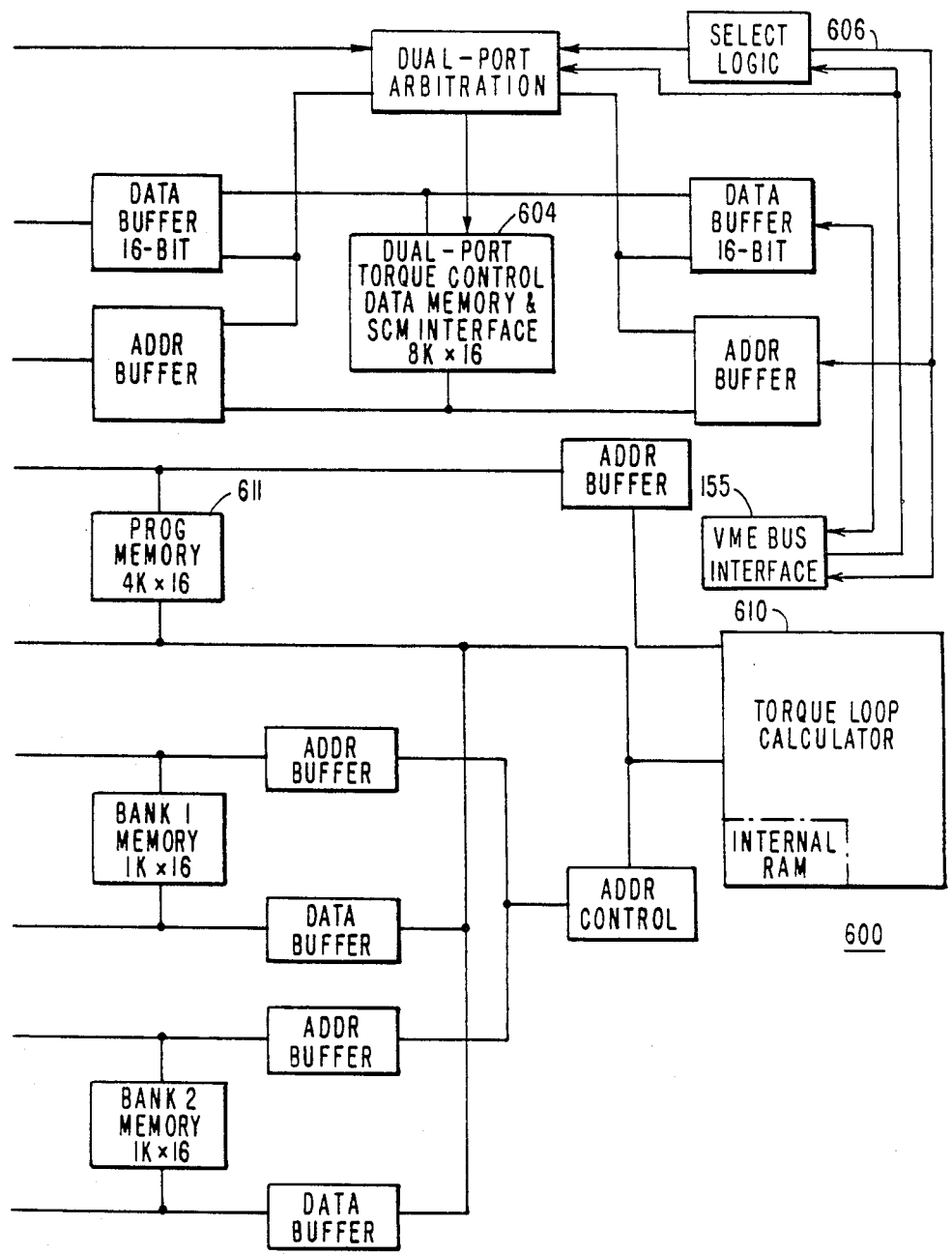

The torque control is embodied on a generic control circuit board 600 FIGS. 6A-1 and 6A-2 called a torque processor (TP) board i.e., an electronic board usable to provide torque control for a wide variety of robots having different load capacities, different types of drives, different numbers of axes, etc.

The torque processor board 600 employs digital circuitry to generate voltage commands for each joint motor or axis drive on the basis of torque commands obtained from a higher control level (SCM board) and feedback currents obtained through the arm interface (AIF) board 800 from the axis drives. Thus, the torque control loops for all of the joint motors are closed through the TP board circuitry.

In the case of electric drives, the feedback current is the motor winding current which is proportional to actual motor torque. For hydraulic drives, the feedback signal is also proportional to actual motor torque.

The digital torque control circuitry is preferably structured with multiple digital processors so that needed control computation and control support functions can be achieved for all axes accurately and efficiently within sampling frequency requirements.

In particular, a torque control manager 602 interfaces with a dual port SCM interface memory 604 for the exchange of stored torque control data between the SCM (servo control module) and the TP (torque processor) control levels. Axis torque commands and control loop parameters are downloaded from the SCM to the TP interface memory 604 through a data bus 606 preferably of the VME type. In return, status data is uploaded to the servo control level (SCM). The memory interface 604 between the TP and SCM boards is a dual port shared memory scheme which serves as a slave to the VME bus 606. Other board memories include a ping-pong memory 608, program EPROM, local RAM, and TP calculator memory.

The torque control manager 602 also directs the flow of current feedback from circuitry on the AIF board 800 at the next lower control level to the torque processor board 600 for torque control loop operation. Drive voltage commands resulting from torque control calculations are directed to the arm interface (AIF) board 800 by the torque control manager 602. The ping-pong (bank switched) memory 608 operates under the control of handshake flags to store command, feedback, and status data so that it is available when needed for torque control calculations or for higher control level reporting requirements or for axis drive control.

A coprocessor 610 provided in the form of a digital signal processor operates as a torque loop calculator which receives torque commands and feedback currents from the torque control manager 602 through the ping-pong memory 608, calculates drive voltage commands for the various robot axes from the torque errors computed from the torque commands and feedback currents, and transfers the drive voltage commands through the ping-pong memory 608 to the arm interface circuitry on command from the torque control manager 602.

With the described digital circuit structure, all needed torque control functions are able to be performed rapidly (250 microsecond sampling rate or better) and accurately within frequency response requirements. Specifically, the rapid calculating capability of the digital signal processor 610 is employed for the torque control calculations as the data organizing and directing capability of the torque control manager 602 is employed for most other functions thereby enabling highly improved control performance to be achieved efficiently and economically.

The torque control manager 602 can, for example, be a Motorola 68000 which has an architecture well suited for the tasks described for data management but which has a calculating speed (i.e., over 4 microseconds for a 16×16 bit multiplication) too limited to meet torque control bandwidth requirements. The torque calculator 610 can for example be a Texas Instruments 320 digital signal processor which has an architecture set for Z transform calculations (i.e., a calculating speed of 200 nanoseconds for a 16×16 bit multiplication) but which is otherwise generally unsuitable for the kinds of tasks assigned to the torque control manager 602.

TORQUE CONTROL PROGRAMMING

The torque processor board 600 is operated under the control of programs executed in the on-board processors 602 and 610 to implement torque command signals from the higher SCM control level.

The torque processor software generally performs the following tasks which are partitioned as indicated:

Torque Control Manager 602

Communication with SCM
Command handling
Current sampling, conversion and offset adjustment
Commutation switch flag (state reading)
Ping-pong memory management
PWM chip management
Diagnostics
Error reporting

Torque Loop Calculator 610 (program cycling based on 250 microsecond interrupt)

Overcurrent check-absolute and average
Torque loop calculations
Current averaging
PWM compensation
Commutation compensation
Back emf check-monitors velocity for safety
Energy check-tests for stall conditions

TP MANAGER

More particularly, the torque control manager 602, as its name implies, directs most of the torque processor board operations. The torque loop calculator 610 affects board operations in the sense that calculated outputs enable certain board operations to occur under the direction of the torque control manager 602.

The programming for the torque control manager 602 includes various conventional system housekeeping programs which support the operation of application programs involved in embodying the invention. The application programming is stored in an EPROM memory 614 referred to as the TCM (torque control management) program memory. Operating data is stored in a local RAM memory 616 referred to as a TC (torque control) data base memory.

Referring to FIG. 7A, torque control management programs include a main program 618 and an interrupt program 620. Generally, the main program 618 includes a reset subprogram 622 which provides the initialization service needed at the arm interface and torque processor control levels for startup of TP board operation. The reset subprogram 622 additionally signals the higher SCM control level when the TP board 600 is ready for operating commands.

Thereafter, a wait command subprogram 624 administers the execution of diagnostic and other high priority nonmotion commands from the higher SCM control level. During motion control, torque commands are periodically generated, preferably each millisecond, and transferred under the control of the torque manager interrupt program 620, detailed in FIGS. 7F-1 to 7F-4, through the ping-pong memory 608 to the torque loop calculator 610 in FIG. 6A-2. The interrupt program 620 is operated cyclically by interrupt signals generated at the sampling rate (preferably every 250 microseconds) by an interrupt clock located in the lower level AIF board 800. The interrupt clock also provides the timing control for generation of the SCM torque commands every millisecond.

The interrupt program 620 in turn performs various administrative functions needed to support the operation of the torque loop calculator 610 as it performs torque calculations for each of the six axes of the robot arm during each interrupt cycle. Voltage commands resulting from torque loop calculations are routed from the ping-pong memory 608 for storage in the TC data base memory 616 and then through a data bus 607, and bus interface 156, preferably the VMX type, to the AIF board circuitry for conversion to pulse width modulated signals by the axis drives. Current and status feedback data is also transferred from the VMX bus 607 for storage in the TC data base memory 616 and subsequent routing through the ping-pong memory 608 for use in the torque calculator 610.

The bus 607 operates in the specific embodiment in accordance with VMX specifications for timing and signal pin number association. However, full VMX bus specifications associated with arbitration, multiple bus masters, and 24-bit address capability are not supported. Further, certain signals not specified in the VMX bus specifications are employed for control, interrupt, and error condition status information.

Various subroutines 626 are employed by the reset and wait command subprograms 622 and 624 and the interrupt program 620. The reset subprogram 622 also employs initialization subroutines 628.

Figure 7C:
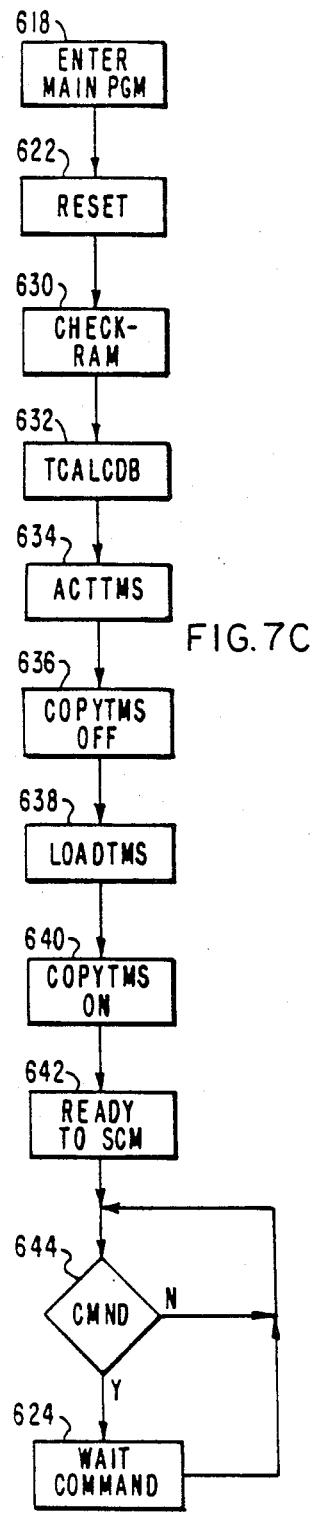
Figure 7G:
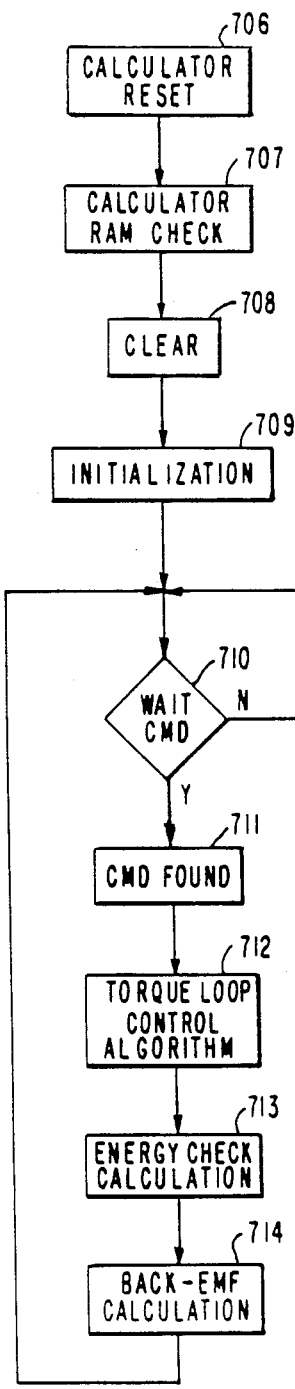
Figure 7D:
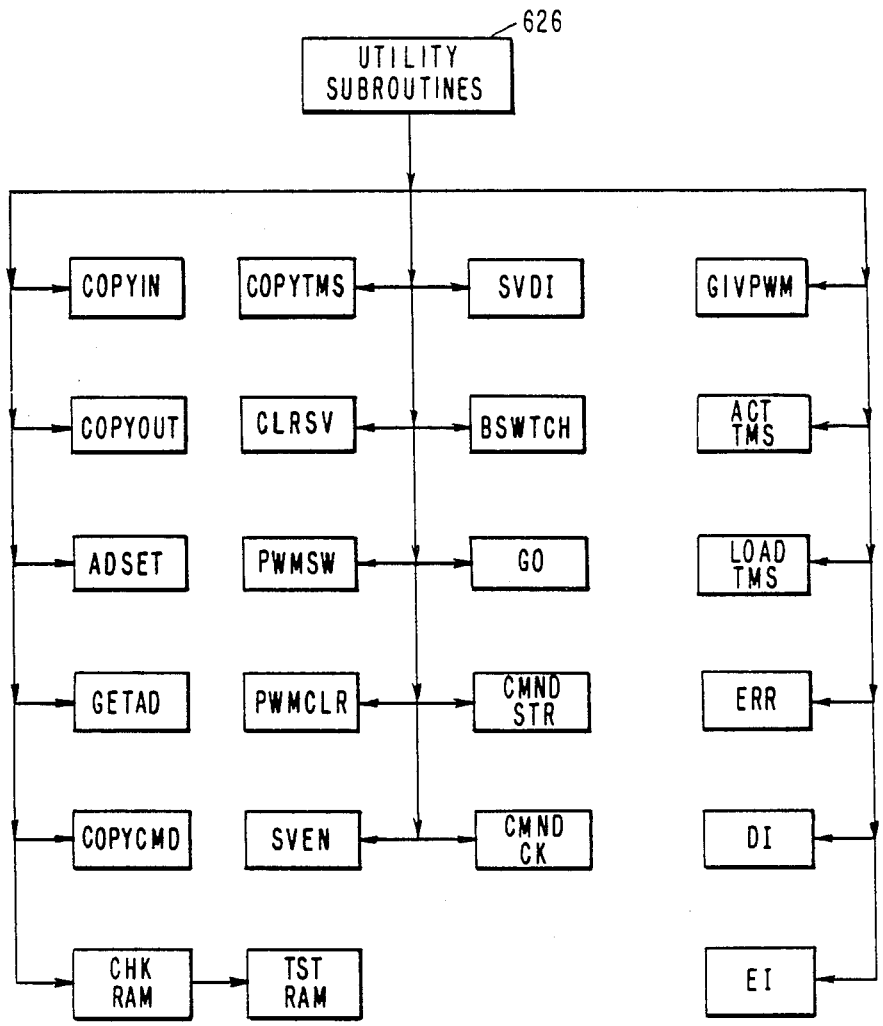

As shown in FIG. 7D, the utility subroutines include the following with the functions indicated:

CHECKRAM-preselected memory diagnostics-check all RAM memories on board 600.

RAMTEST-apply bit tests to selected memory locations.

GETAD-enable transfer of analog input to memory.

AD-SET-set analog/digital converters in feedback channels.

COPYIN-copy specified parameters for 6 arm joints from torque control data SCM interface memory 604 to TC data base memory 616.

COPYOUT-copy specified parameters for 6 arm joints from TC data base memory 616 to torque control data SCM interface memory 604.

COPYTMS/S-COPYTMS-copy to/from TC data base memory 616 and ping-pong memory 608.

COPYCMD-copy command from TC data base memory 616 to ping-pong memory 608.

CLRSERVO-clear on-line torque loop calculation data in TC data base memory 616 and ping-pong memory 608.

PWMSW-on/off switch for PWM chip which is located in the arm interface control level and normally generates power amplifier commands for the arm drives.

PWMCLEAR-zero output command to PWM chip.

SVENABLE-specify maximum voltage command acceptable for execution.

SVDISABLE-hold PWM at zero output.

LOADTMS-download program to RAM memory 611 for the torque loop calculator 610.

ACTTMS-activate/deactivate torque loop calculator 610.

GIVPWM-apply voltage command to PWM chip.

COMMCHECK-receive position feedback data for all 6 drives and set respective flags if different from the next previous data.

COMMSTORE-store commutation state for all 6 joint motors.

GO-send GO signal to control register 630 (FIG. 6A) for torque loop calculator 610.

BSWITCH-switch command for ping-pong memory 608.

ERR-report error to higher SCM control level.
DI-disable execution of interrupt program 620.
EI-enable execution of interrupt program 620.

The initialization subroutines 628 employed in the reset subprogram are shown in FIG. 7B and include the following:

DATDIR-create in the TC data base memory 616 a data directory for the SCM interface memory 604.

STRPWM-store PWM I/O address in TC data base memory 616.

TCALCDB-clear and initialize the torque loop calculator data base in the internal RAM memory of the torque loop calculator 610.

TCONTDB-clear data base parameters in the TC data base memory 616.

PROGRAM FLOW CHARTS FOR TP BOARD MICROPROCESSORS

The main program 618 of FIG. 7A is illustrated in greater detail in FIG. 7C. Once the torque processor board 600 is started, the torque control manager 602 enters the main program 618 and executes the reset subprogram 622 to provide initialization service. As a result, the identification code for the torque control manager 602 is written onto the VME data bus 606 in FIG. 6A-2 for communication to the higher control levels that may be packaged together in any particular robot application.

In addition, all semaphores are set to the same invalid state and the torque loop calculator 610 is cleared and reset. The local input/output hardware latch 630 in FIG. 6A-1 operates as a selector for hardware or software control for the torque loop calculator 610 and a flag is set to enable control from the torque control manager 602 when the software control flag is set.

In its final phase of execution, the reset subprogram 622 in FIGS. 7A and 7C calls the utility subroutine PWMEN and a signal is thus generated for the next lower control level (arm interface level) to clear the arm drive circuitry and specifically to switch a controlling digital device referred to as the PWM chip to the OFF state.

The main program 618 in FIG. 7C continues the start-up procedure by calling the utility subroutine CHECKRAM in block 630 to provide memory diagnostics on all RAM memories on the TP card 600. Next, the initialization subroutine TCALCDB is called as indicated at 632 to clear/initialize the torque loop calculator manager local RAM in the TC data base memory 616.

The torque loop calculator 610 is then activated to the ON state by the subroutine ACTTMS as shown at 634. Next, the utility subroutine COPYTMS is called in block 636 to disable data copy to and from the TC data base memory 616 and the ping-pong memory 608. The utility subroutine LOADTMS is then called to download the TMS programming to the memory 611 as indicated at 638.

In block 640, the utility subroutine COPYTMS is again executed to enable copy to and from the TC manager local RAM memory 616 and the ping-pong memory 608. A signal is then generated by block 644 for the next higher SCM control level that the TP board 600 is now ready for robot control operation.

During subsequent active robot control operation, the main program 618 enters a wait command mode in which it undergoes continuous looping operation awaiting special high priority commands that may be generated by the higher SCM control level. Thus, block 644 determines whether a special command has been sent down to the TP board 600. Looping continues on the block 644 until a command is detected at which time the wait command subprogram 624 is called. After its execution, the command detection loop is re-entered until the next SCM command is received. In the block 644, SCM command detection is performed by looking at the appropriate semaphore 3 to determine whether a flag has been set to signify that the higher SCM control level has downloaded a special command to the TP board 600.

Figure 7E:
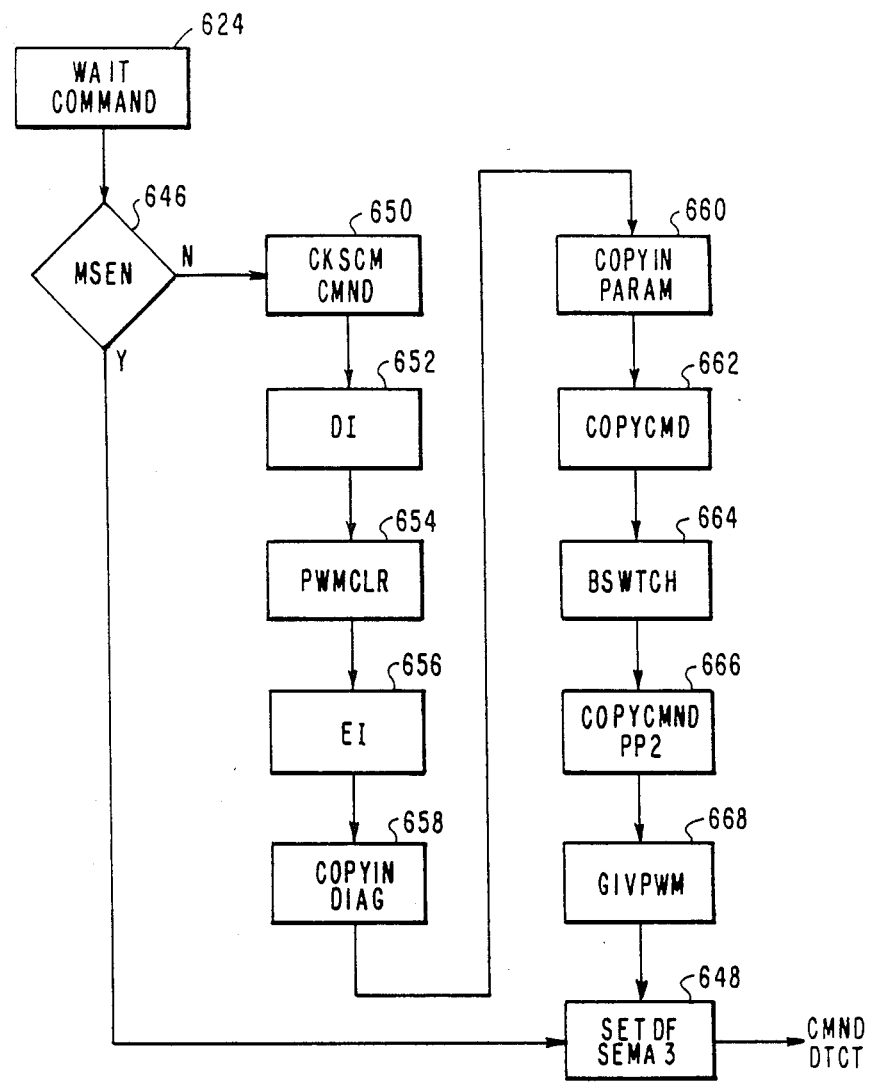

As shown in FIG. 7E, the wait command subprogram 624 first determines whether the system is ready for controlled robot arm motion, i.e., whether the higher SCM control level has just generated a master servo enable signal as indicated in block 646. In the master servo enabled mode, the SCM control generates a series of torque command signals for execution by the TP board 600. Preferably, the torque commands are generated once each millisecond as clocked from the AIF control level.

If a master servo enable signal has been generated to provide priority motion control, block 648 sets the appropriate semaphore flag down acknowledging to the higher SCM control level that the command has been received and that a response has been taken. The wait command subprogram then returns to the SCM command detection loop as robot arm motion control is implemented.

On the other hand, if the master servo is disabled, block 650 first checks an SCM command setup bit and block 652 next disables interrupt program execution since a command having higher priority than motion commands must be ascertained and implemented. Block 654 then calls the subroutine PWMCLEAR to set the output voltage command to zero. Next, the interrupt program is enabled to resume arm motion control on an interrupt control basis.

In blocks 658 and 660, a determination is made whether a diagnostic command or a parameter change command has been downloaded, and the SCM command is copied by the subroutine COPYIN in the TP manager local RAM memory 616 for execution. Block 682 executes the utility subroutine COPYCMD to transfer the command to bank 1 of the ping-pong memory 608. Thereafter, BSWITCH is executed by block 664 to enable block 666 to transfer the SCM command to bank 2 of the ping-pong memory 608. In turn, the torque loop calculator 610 then executes the SCM command, and block 668 generates a signal for the SCM control level that the downloaded SCM command has been executed. The block 648 then sets the semaphore 3 down flag and program execution continues as previously described.

Figures 1, 7F:
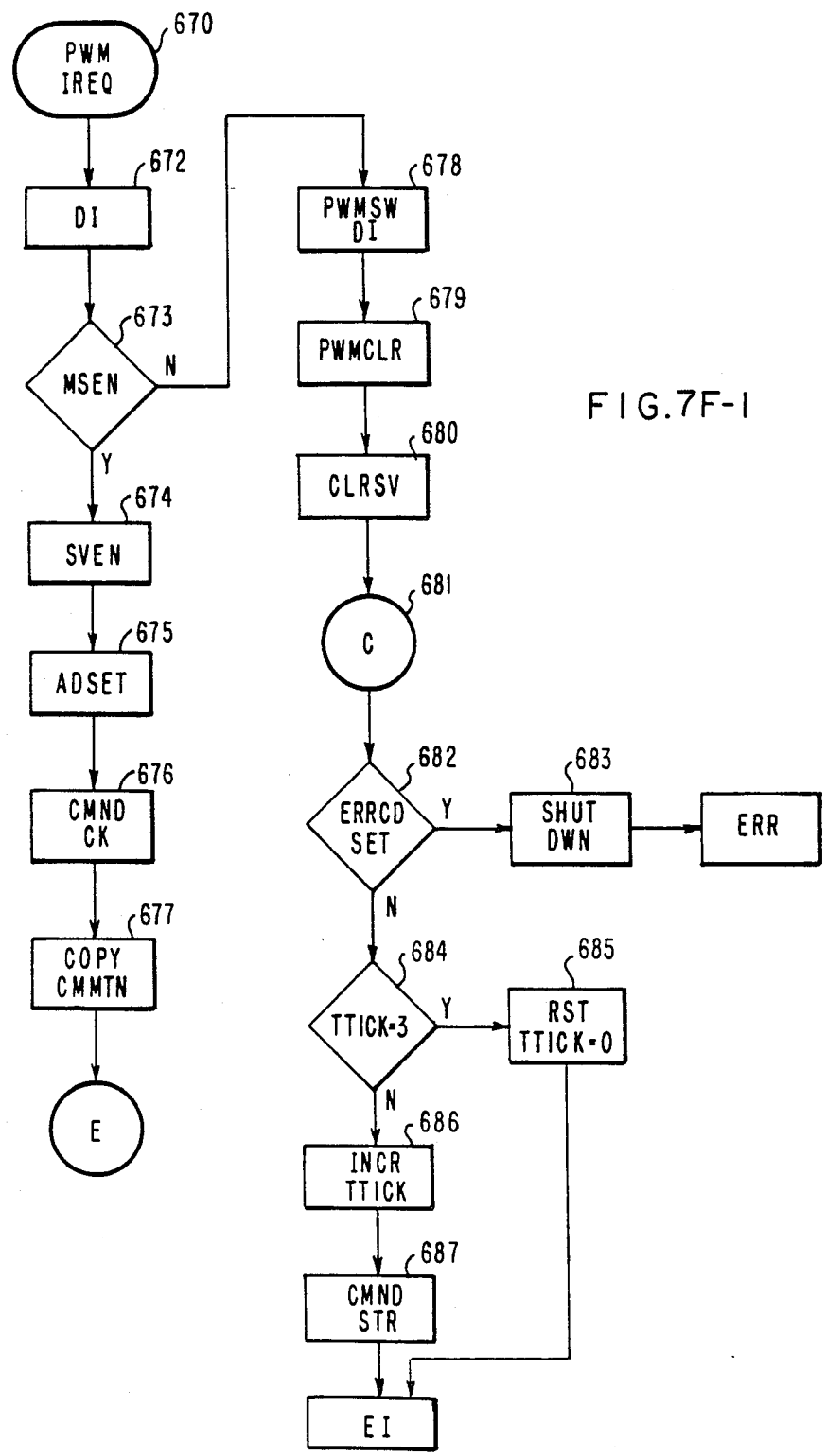
Figures 2, 7F:
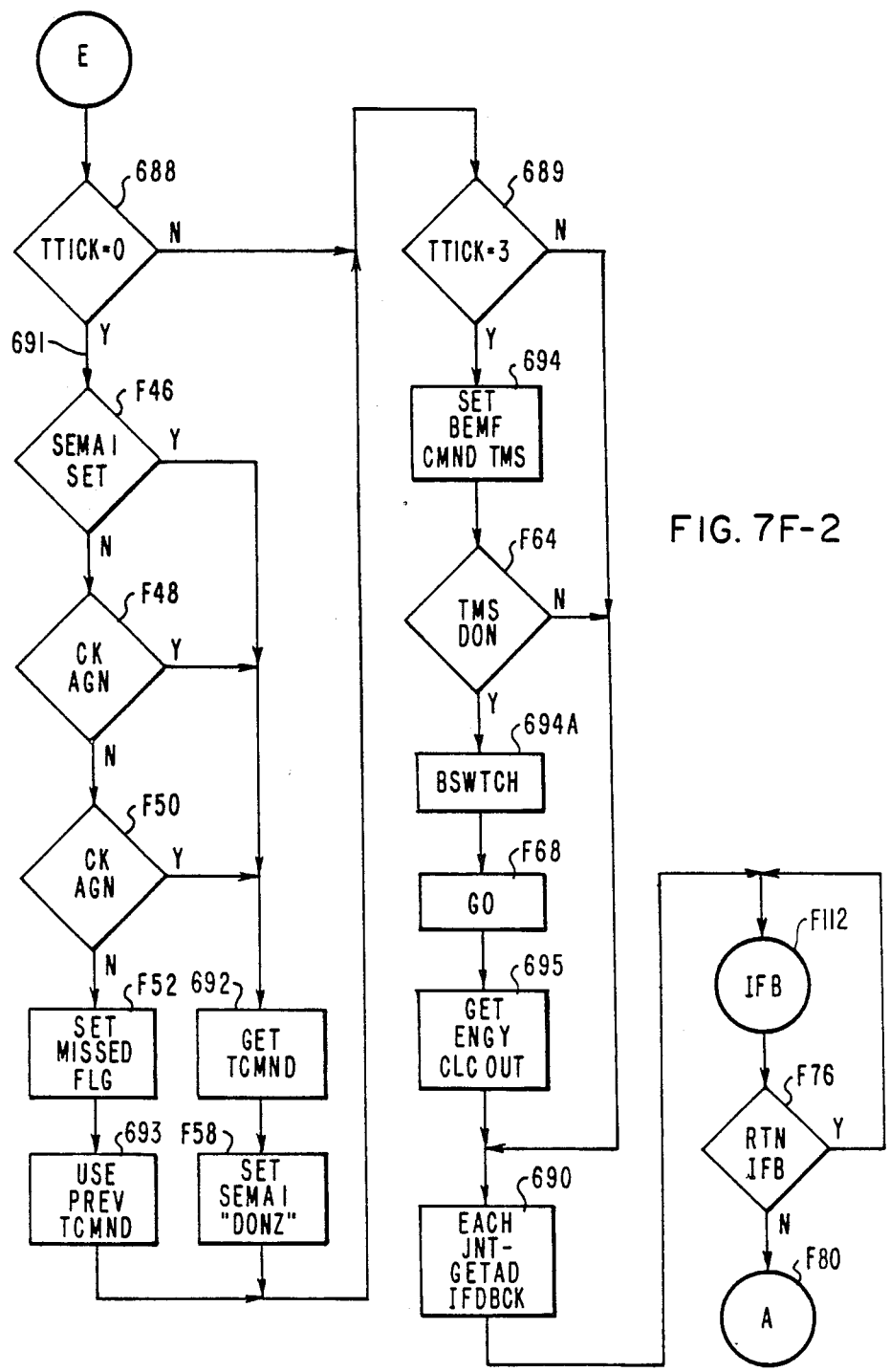

The interrupt program 620 of FIG. 7A is shown in greater flow chart detail in FIGS. 7F-1 through 7F-4. It is initiated as indicated at block 670 in FIG. 7F-1 once the interrupt clock signal from the AIF board 800 is enabled in the wait command subprogram 624 shown in FIG. 7A. Thereafter, it is executed at the control loop sampling rate, i.e., the interrupt rate of once every 250 microseconds.

Block 672 disables the interrupt and block 673 determines whether the master servo is enabled to permit robot control. If it is, the SV-ENABLE (SVEN), AD-SET, COMMCHECK (CMNDCK) and COMM- STORE (COPY CMMTN) utilities are executed in blocks 674–677.

If the master servo is not enabled, i.e., robot control is not permitted, PWMSW subroutine is executed in block 678 to disable PWM motor control chips on the AIF board 800 and the utilities PWMCLR and CLRSV are executed in blocks 679 and 680.

Thereafter, an end interrupt branch 681 is entered and block 682 checks for shutdown errors block 683 executed robot shutdown if shutdown error exists. If block 684 detects that the interrupt clock tick (generated every 250 microseconds) has reached a 3 count in the current millisecond common cycle time, block 685 resets the counter to 0 and the program ends. If not, block 686 increments the counter, block 687 stores the motor commutation states and the program ends.

With reference to FIG. 7F-2 for the case of an enabled master servo, blocks 688 and 689 check for a tick count of 0 and 3. If neither exists, block 690 next gets the current feedback for each robot axis. If the tick count is zero, branch 691 gets the new torque command (box 692) or, if missed, uses the previous torque command (box 693). At the tick count of 3, back emf command is sent to TMS (box 694) and energy calculation output is obtained (box 695) and the ping-pong memory switch is set (box 694A).

The routine for fetching current feedback and performing other functions to be performed after each tick is designated as IFB, and it is looped in FIG. 7F-4 until the six axes have been completed. As shown in FIG. 7F-4, the ping-pong memory switch F122 is set, PWM voltage commands are outputted by box F134 and BACKEMF is outputted by box F128. Limit checks are also made at F130 and F138. Thereafter, the program is branched to F80 via F76.

Figures 3, 7F:
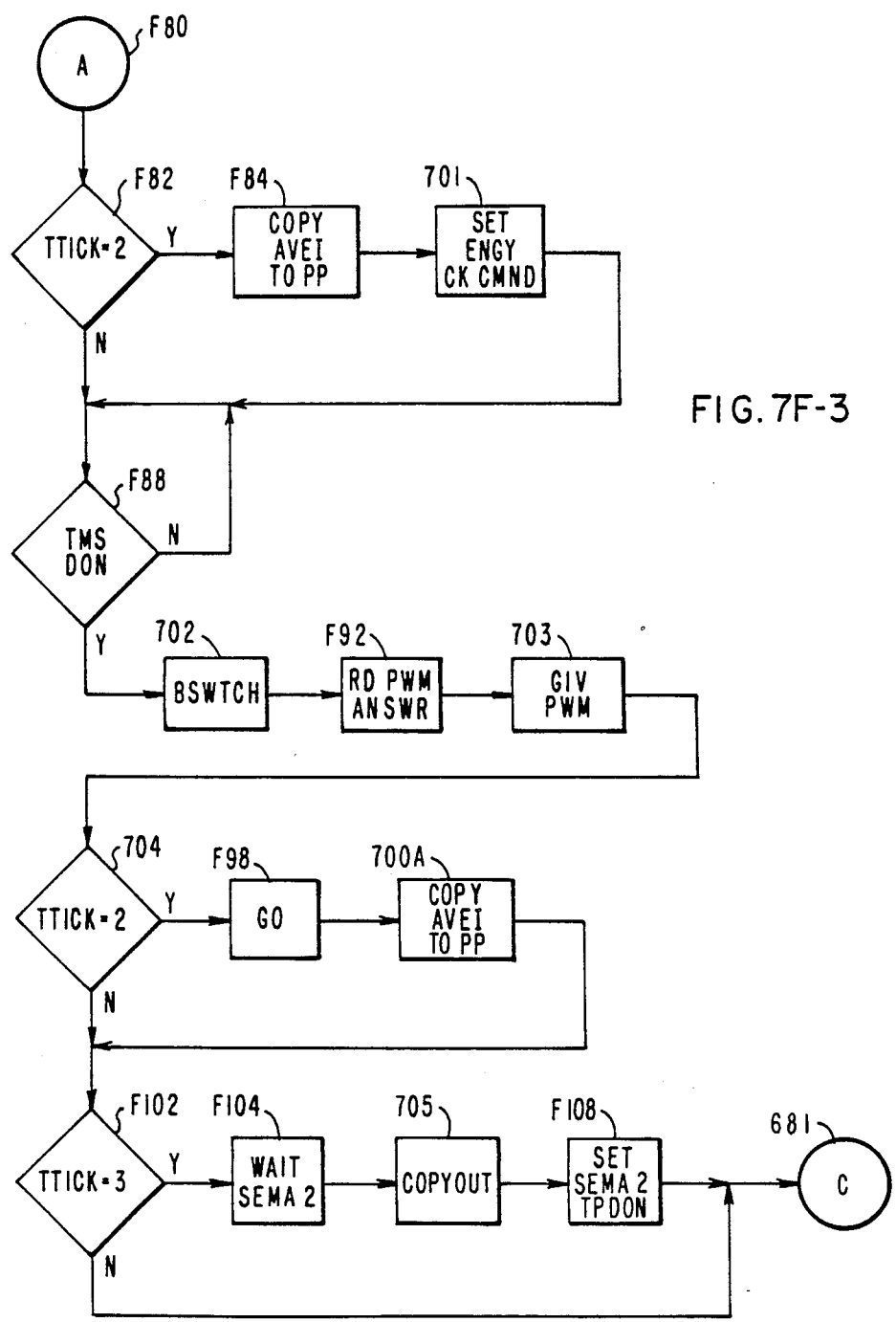
Figure 7F:
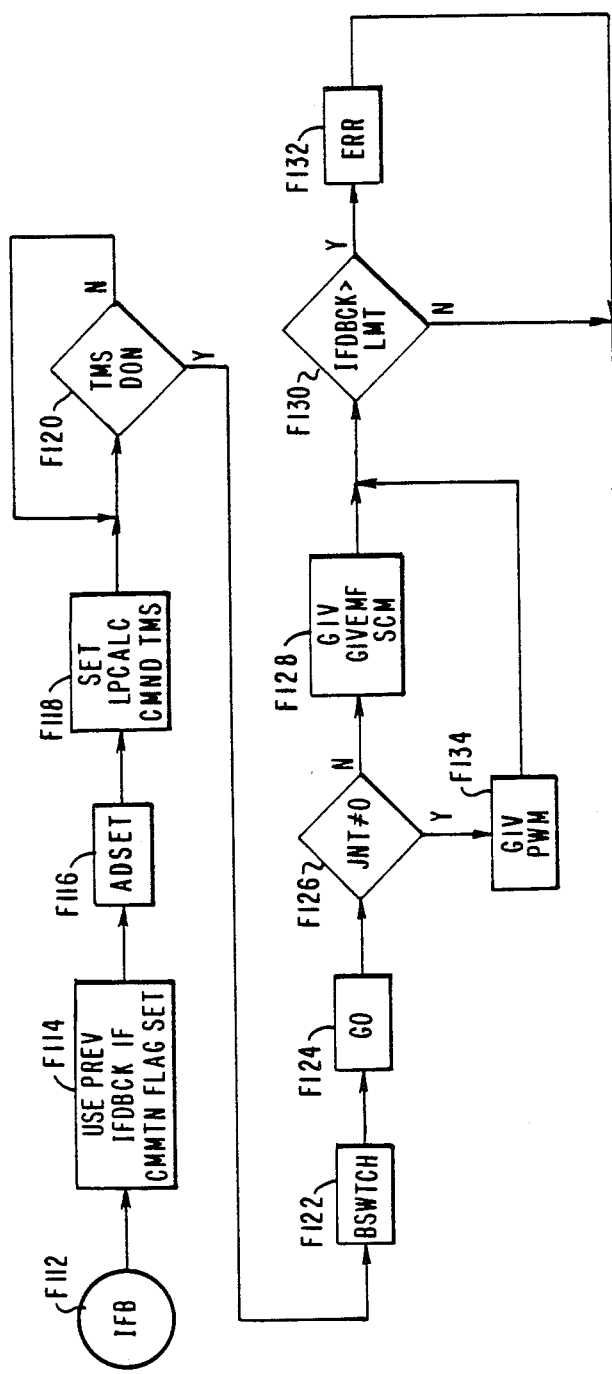
Figure 4:
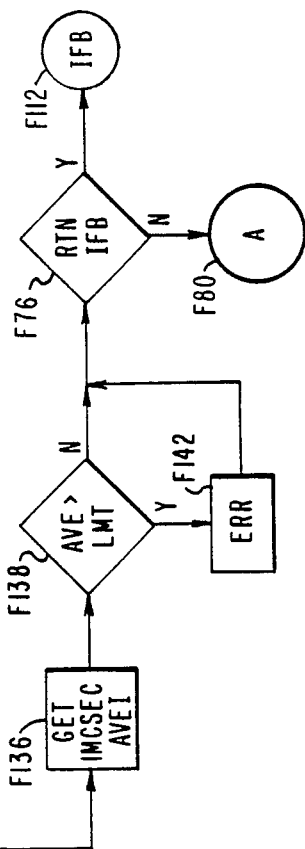

On return to main program branch F82 in FIG. 7F-3, box F84 copies average current to the ping-pong memory and box 701 sets the energy check command if the tick count is 2. Box 702 sets the ping-pong memory switch and box 703 outputs PWM voltage commands.

Block 704 in FIG. 7F-3 again checks the tick counter and if the count had not been but is now 2, block 700A copies average current to the ping-pong memory. Thereafter, flags are set and certain data is copied out in block 705 if the tick count is 3 in block 705. Finally, the end interrupt branch 681 in FIG. 7F-1 is entered to close out the execution of the interrupt program 620 using instructions shown at 682 to 687 in FIG. 7F-1.

TP CALCULATOR

Programming for the TP calculator 610 is shown in FIG. 7G. A MAIN program 710–714 is executed cyclically at the sampling rate, and blocks 706, 707, 708 and 709, respectively, provide calculator (TMS) reset, and calculator (TMS) RAM check, clear and initialization. Block 710 thus waits for a torque command from the torque manager 602 of FIG. 6A-1.

When block 711 indicates availability of a torque command, the torque loop control algorithm is executed by box 712 for all six joint motors. Then, energy calculations are made in block 713 and back emfs are calculated in block 714 prior to ending the program execution.

CONTROL ALGORITHMS

A more detailed diagram of the torque control loop portion of the overall robot control is shown in FIG. 3B. The following control algorithms are executed in the torque loop calculator 610 in the implementation of the torque control loop portion of the overall robot control loop arrangement.

PI Control Algorithm

This algorithm is described in terms of a 250 microsecond sample period.
(1) Input:
  torque command    Tc    from SCM (1 ms. update rate)
  feedback torque    T    from A/D converter
                          (250 micro sec. update rate)
  Tc, T are scaled as follows: 10 significant bits stored in
  16-bit quantity left justified with a sign bits. This
  format is selected to simplify the A/D interfacing.
      SDDD DDDD DDXX XXXX
Output:
  PWM command    PWMout    to PWM command register
                          (250 micro sec. update rate)
(2) Principle:

$$\text{PWMin} = K_p \frac{(s + 1/\tau)}{s} * \text{Terr}$$

Terr = Tc − T
Kp: torque loop proportional gain
tau: time constant of integral (mechanical time constant of motor)
(3) Algorithm
    /* get error */
    T(n) = (input data from A/D)
    /* normalize the size */
    Terr = (Tc(n)*2**10 − T(n)*210)/216
    /* compute next integral */
    temp(n) = integ + KI * Terr
    /* check the integration limit */
    if (temp <= −intlmt) then temp = −intlmt
    if (intlmt <= temp) then temp = intlmt
    /* store the integral value for next time */
    integ = temp
    /* get PI result */
    temp = integ/2**16 + KP * Terr
    /* check the overflow */
    if (temp > 78FF) then temp = 78FF
    if (temp > 8680) then temp = 8680
    /* now linearize the PWM* */
    if (temp >= 200) then PWMout = temp + 700
    if (200>temp >= 0) then PWMout = temp * 2 + 500
    if (0>temp >= FDCO) then PWMout = temp *2 + FB80
    if (FDCO > temp) then PWMout = temp + F980
    KI = (KP/tau)*Ts
    Ts = sample period = 250 micro sec.
(4) Scaling of KP and KI
    (i) dimensions kp: [V/N-M]
         tau,TS: [sec]

| Torque | Current | Terr*2**6 |   | PWMout | Motor Volt |
|--------|---------|-----------|---|--------|------------|
| N-M    | A       | bits      |   | bits   | Volt       |
| >--- Kt | ----- Kad | ----- KP*2**−16 | ----- Kpwm ------- > |

<= = = = = = = = = Kp = = = = = = = = = = >

Kt         torque − current gain    [A/N-M]
    Kad        A/D converter gain       [bit/A]
    Kpwm       PWM gain                 [V/bit]
    (ii) equation
         Kt*(Kad)*KP*(2**(10−16))*Kpwm = Kp
         Kp = Kp*(2*6)/(Kt*Kad*Kpwm)
         KI = KP*Ts/tau
Note:
1. If A/D converter full scale is +/− Imax then
   Kad = 2**15/Imax [bit/A]
2. If PWM chip and power block gain is +/− Vmax then
   Kpwm = Vmax/2**15 [V/bit], therefore, Kad*Kpwm =
   Vmax/Imax [V/A]

Back-emf Algorithm

The back-emf EMF calculation is used to provide an estimate of motor speed for safety purposes.
(1) input:
           motor current    i      from A/D converter
           motor voltage    Vin    from PWM command
                                   register
    Output
           Back-emf         VEL    estimated velocity
(2) Principle:

-continued

```
VEL = w*Ke = Vin — (L*di/dt + iR)
R = motor resistant                    [ohm]
L = motor inductance                   [H]
Vin = motor terminal voltage           [V]
Ke = motor Back-emf constant           [V/rad/sec]
w = motor velocity                     [rad/sec]
i = motor current                      [A]
(3) Algorithm:
VEL(n) = [PWMout*2**9 — MOTL* i(n) — i(n — 1) —
i(n)*MOTR]/2**16
where:
i(n) is A/D value shifted right 6 bits and
accumulated 1 mesc/Ts times (running 1 msec
average).
Ts is PWM sample rate = 250 micro sec
(4) Scaling of L, R:
    (i) equations:
        MOTR = 2**13 * Imax/Vmax * R(ohm)
        MOTL = 2**13 * Imax/Vmax * 1/delt * L(H)
        SV = 2**—8 * Vmax
        where Krpm = (SV/KE) * VEL
    (ii) example:
        Vmax = 300V, Imax = 20A, R = 0.49 ohm, L = 5.5 mh
        KE = 120V/Krpm, delt = 4 msec
        MOTR = 268, MOTL — 751
        Krpm = 9.76 * 10** —3 * VEL
    Vin       PWMout          VEL            VELemf
    V         bits            bits           bits
    --- Kpwm-------2**—9--+-----2**—16*SV-----1/KE---
                          |
    Iin                   |
    A                     |        Kpwm = Vmax/2**15
    --Kad--2***2-6)--MOTR-|        Kad = 2**15/Imax
                --MOTL-  |
```

Energy Check Algorithm

The energy check calculates motor energy and
alarms the SCF when energy exceeds a specified limit for a
specified period of time.
(1) Input:

```
        current       CUR1      1 msec averaged current
        energy limit  ELIMIT    from SCM (constant)
        time constant tau       from SCM (constant)
    Output:
        alarm         ECODE     to SCM
(2) Principle:
            i*i            Energy
    i----x---1/(1+as)------Threshold----Alarm
         |   |
         |   | 1st order filter
         |---|
             i = current [A]
(3) Algorithm:
    temp = CUR1**2 — ENERGY
    ZOENGY = ZOENGY + temp
    ENERGY = ZOENGY / 2**16 * TAU
    if ENERGY > ELIMIT
    then ECODE = OVENGY
(4) Scaling:
    (i) condition of alarm output
        if step input of i**2 = k*limit is applied, then
        output an alarm condition tx seconds after step
        is applied.
    (ii) equation
        a = delt * 2**16/tau
        TAU = delt * 2**16/a
            = about 20 to 40 for delt = 4 msec
```

TP CYCLING OPERATION

Figure 8:
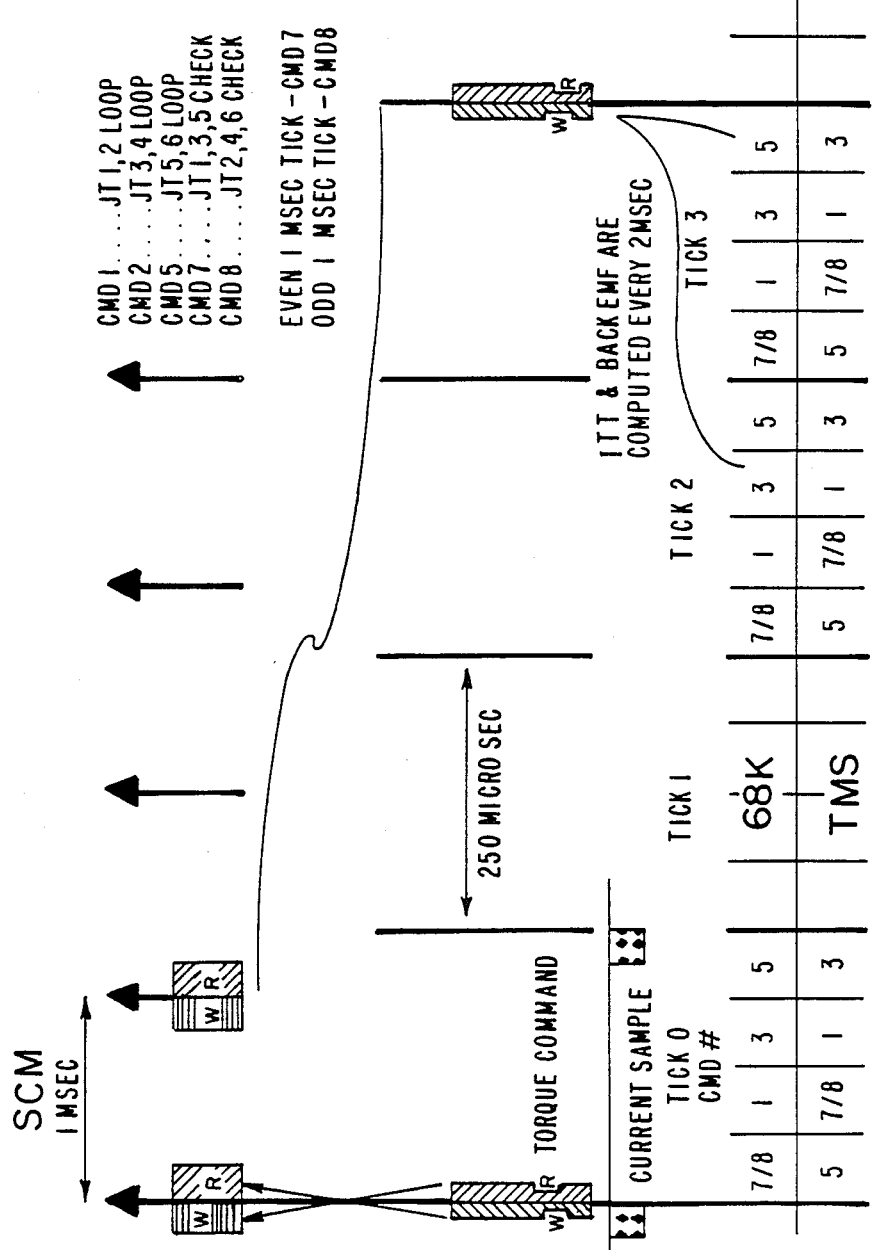
FIG. 8 shows a timing chart for the torque processor board operation.

The cyclic operation of the TP circuitry is shown in FIG. 8 to clarify the manner in which the various control events are interselected. As shown by the upper scale, the SCM board 400 operates on a 1 millisecond cycle. The TP board 600 operates on a ¼ millisecond sampling cycle as shown by the lower scale. The four TP board sampling intervals are marked by ticks 0 through 3.

The latest torque commands are received by the torque manager 600 in the order shown in each sampling interval for the six joints on the 68K scale. With a 62.5 microsecond delay, the torque commands are transferred to the TP calculator in the same order. Current feedbacks are received at the beginning of each sampling interval for all joints and transferred to the TP calculator.

TORQUE PROCESSOR BOARD

The torque processor module 600 in FIG. 4 is implemented as a VME bus compatible single printed circuit board and is intended to provide the basis for mathematical calculations associated with digital torque loop closure in the unicorn robot controller. The hardware implementation of this module is sufficiently general to permit this function to be performed independent of the actual robot arm. All robot arm dependent hardware is implemented on a separate arm interface module. This module receives torque commands from a higher level controller, and provides voltage commands to the arm interface module. This module also receives position, velocity and current feedback information from the arm interface module.

This module, shown in more detail in FIGS. 6A-1 and 6A-2, primarily consists of a Motorola 68000 processor with a TMS-320 serving as a peripheral coprocessor for performing high speed fixed point math calculations. The interface between the 68000 and the TMS-320 consists of bank switched memory 608, with handshake flags to provide command indication to the TMS-320, and to indicate the state of the 68000, TMS-320 interface.

Interface to the higher level controller is provided through implementation of dual-port memory resident within the module. Thus, this module serves as a slave to the VME bus 606. As such, the local processor 68000 cannot obtain direct access to the VME bus. In operation, the torque processor module receives torque commands and loop constants via the dual-port memory 608, and provided feedback consisting of position, velocity, current and status information to the higher level controller via the dual-port memory.

Interface between the torque processor and the arm interface module is provided by a local processor bus expansion and associated P2 connector (not specially shown). The signal interchange associated with this bus follows the VMX bus 607 specifications for timing and signal pin number association. However, the full VMX bus specifications associated with arbitration, multiple bus masters, and 24-bit address capability is not supported. In addition, additional signals not specified in the VMX bus specifications are required for control, interrupt and error condition status indication.

DUAL-PORT MEMORY

Figures 1, 9A:
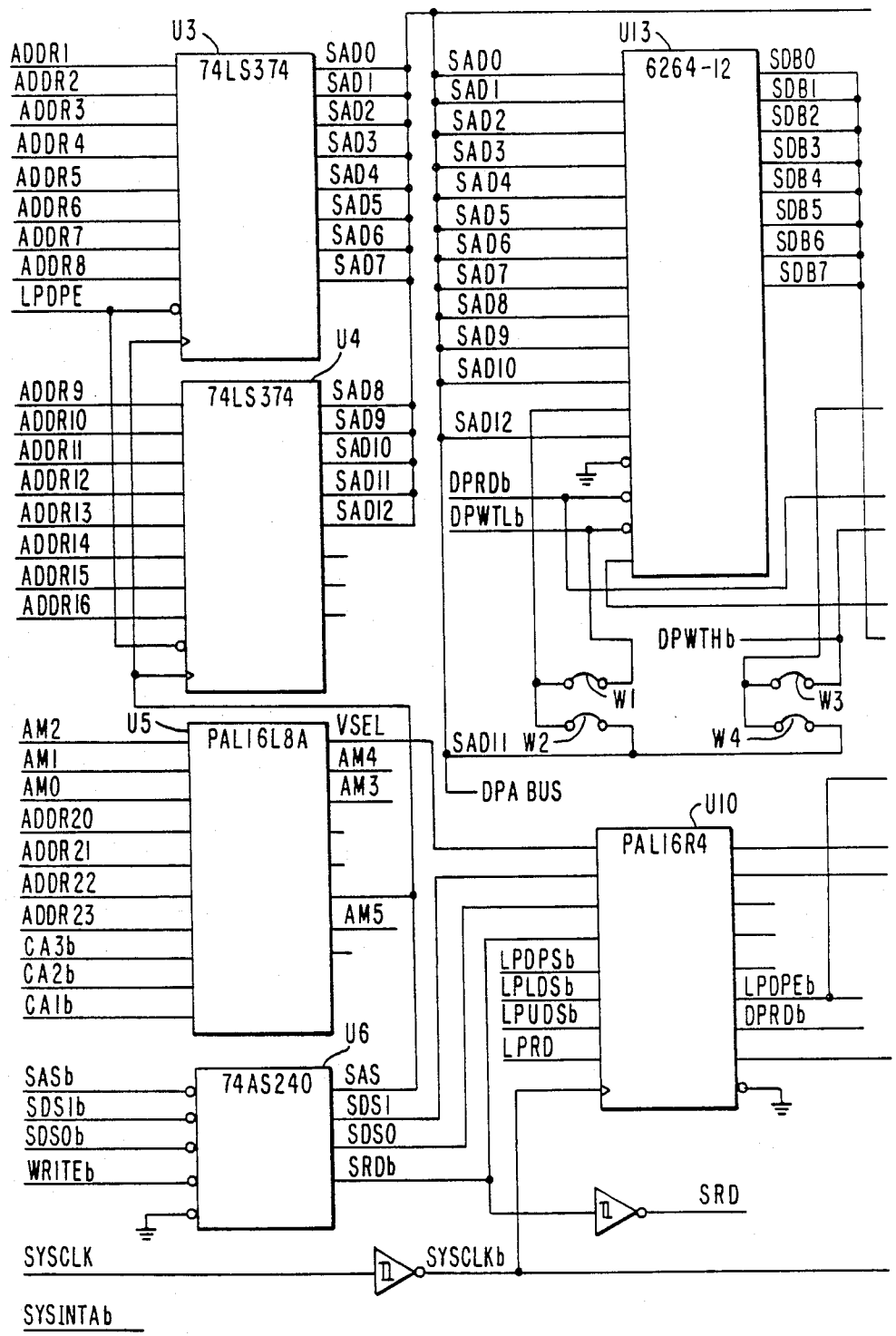
Figures 2, 9A:
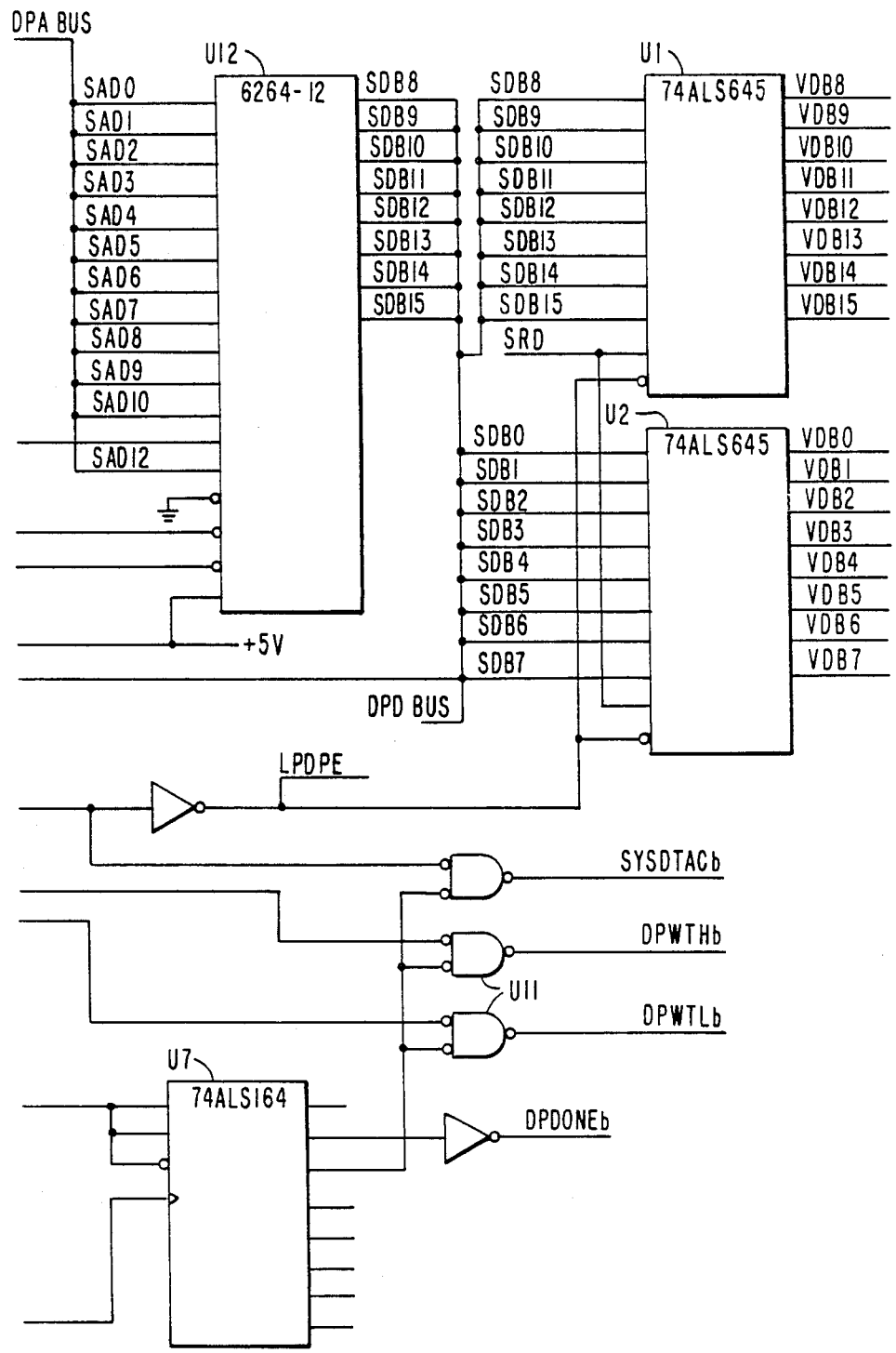

Circuitry associated with the dual-port memory 608 is shown in FIGS. 9A-1 and 9A-2. It is to be noted that this memory is implemented as dual-port and not shared memory. The distinction being that the system bus can have access to this memory without degrading the performance of the local processor, unless the local processor requests access to the memory while the system bus has control of the memory. As such, the dual-port memory utilizes address, data and control buses that are separate from the local processor buses. The interface between the local processor and the dual-port address and data buses are shown in FIG. 9C-3 of the drawings. The control interface is provided by the arbitration PAL device 16 R4, U10 shown in FIG. 9A-1 of the drawings.

Indication of torque processor dual-port memory selection by the VME bus is provided by PAL device U5. Inputs to this device consist of the VME bus address bits A23 through A20, the VME bus address modifier bits AM5 through AM0, card slot identifier bits CA3 through CA1, and the inverted VME bus address strobe signal, SAS. The output of U5, which indicates VME bus selection is provided by signal VSEL. This signal will be asserted, low true when the input conditions meeting the PAL equations are satisfied. These conditions presently require A23 to be high, logical "1", the state of A22 through A20 to match the state of CA3 through CA1, the address modifier bits to be equal to a hexadecimal value of 39, with the VME bus address strobe signal, SAS, asserted.

Some description of the address modifier bits and their purpose is warranted. The address modifier bits are used by the VME bus master to indicate the type of transfer being performed. Transfer types presently specified include supervisory program execution, supervisory data transfer, user program execution, and user data transfer. Each of these basic transfers are further specified to be associated with long address, where 32 bits of address information is used to indicate the transfer location, or standard address, where 24 bits of address information is used to indicate the transfer location, or short address, where 16 bits of address information is used to specify the transfer location. The address modifier 39 code indicates user data, standard address type of transfer. However, the PAL equations can easily be written to provide any of the standard address type of transfers, or to ignore the state of the address modifier bits.

The dual-port arbitration logic is included within the PAL device U10. This device receives request for dual-port memory access by the local processor and by the VME bus, and assigns the memory to one and only of the requesting devices for the transfer. The arbitration logic presently gives the local processor the highest priority for obtaining access to the memory. That is, with simultaneous request by the local processor, and the VME bus, the request by the local processor will be granted before the request by the VME bus is granted.

Device U10 also generates the dual-port memory control signals. These signals include a write high byte, a write low byte, a read (DPRDb), start DTAC timer, and a local processor grant (LPDPE) signals. The DTAC timer is provided by device U7. Devices U11 provide for actual generation of the memory write enable signals. These devices receive the write signal enable outputs from device U10, and a signal from the DTAC timer. These devices are used to disable the write signal to the memory which is necessary to ensure hold time requirements for the memory devices are satisfied. It is to be noted that the VME bus specifications only provide for 10 nanosecond data hold time with respect to non-assertion of the data strobe signals. Worst case timing cannot be guaranteed without disabling the write enable signals by the logic circuitry U11.

The dual-port memory is implemented through devices associated with sockets U13 and U12. The memory can be implemented through usage of either 2K by 8-bit, or 8K by 8-bit memory devices. Jumpers are provided for making memory device type selection. Jumpers W1 and W3 must be installed with usage of 2K by 8-bit memory devices and jumpers W2 and W4 must be installed with usage of 8K by 8-bit memory devices. Memory devices with a maximum access time of 120 nanoseconds or less must be used for these devices with the DTAC timing presently provided.

The address interface with the VME bus is provided by devices U3 and U4. These edge-triggered latches are used to ensure meeting address hold time requirements. The VME bus is only guaranteed to hold the address bus stable for 10 nanoseconds after non-assertion of the data strobe signals and this time is not adequate to ensure that data hold time requirements with respect to read cycles are satisfied. Data is written into these latches when the address strobe signal (SASb) input to U6 is asserted. The data bus interface with the VME bus is provided by devices U1 and U2. These 74ALS645 devices are used to ensure meeting VME bus specifications.

LOCAL PROCESSOR

Figures 1, 9B:
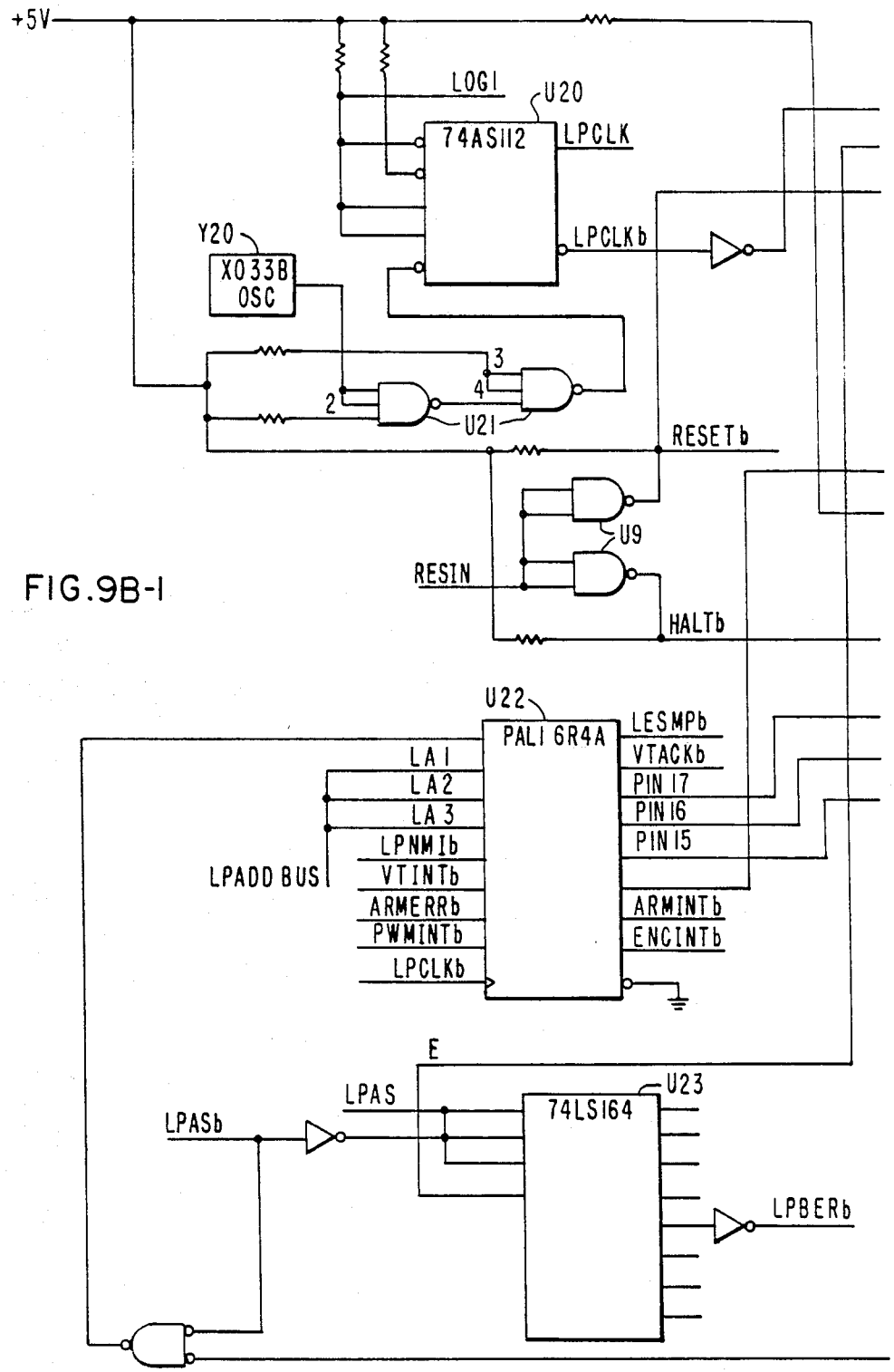
Figures 2, 9B:
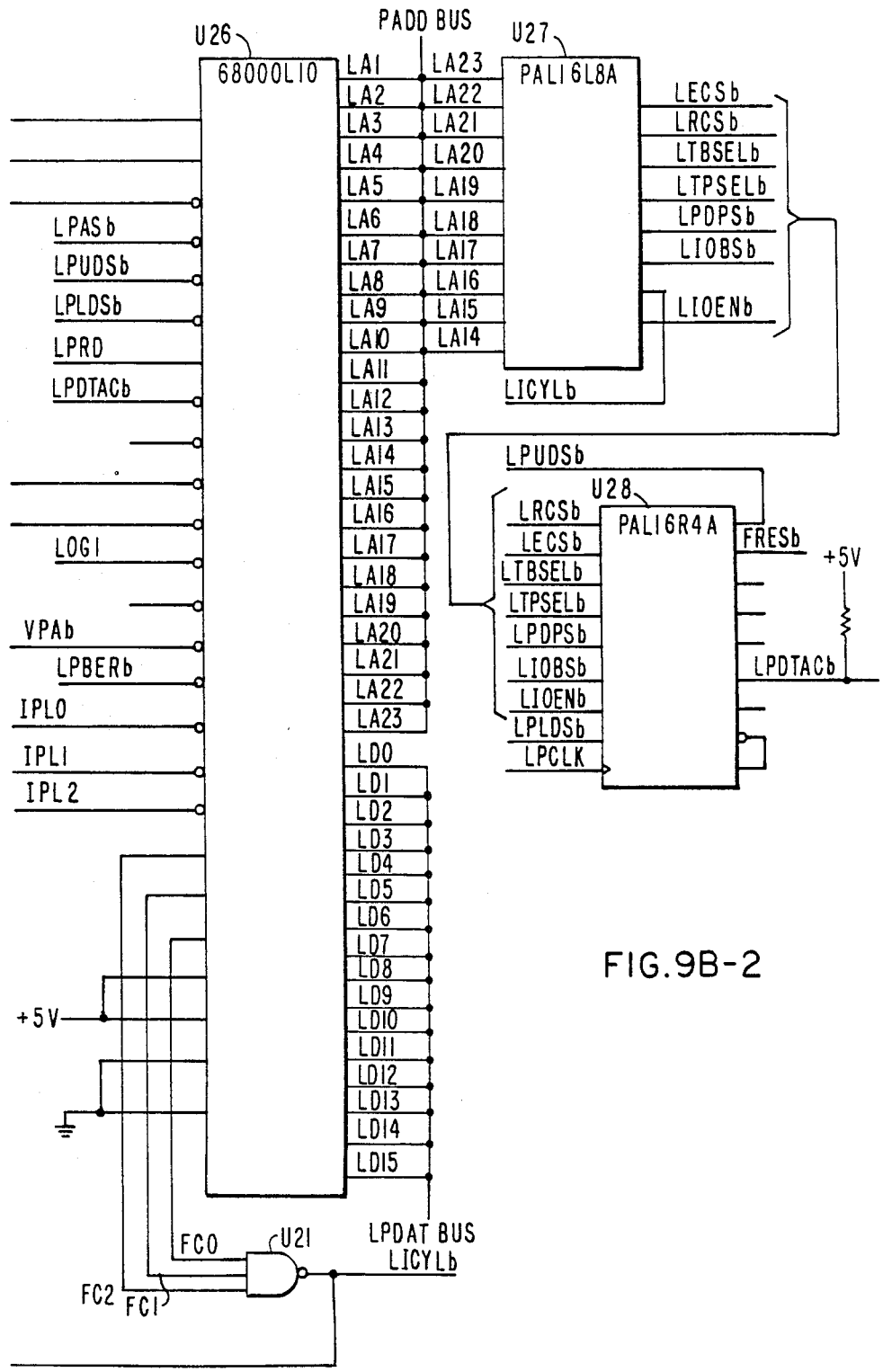
Figures 1, 9C:
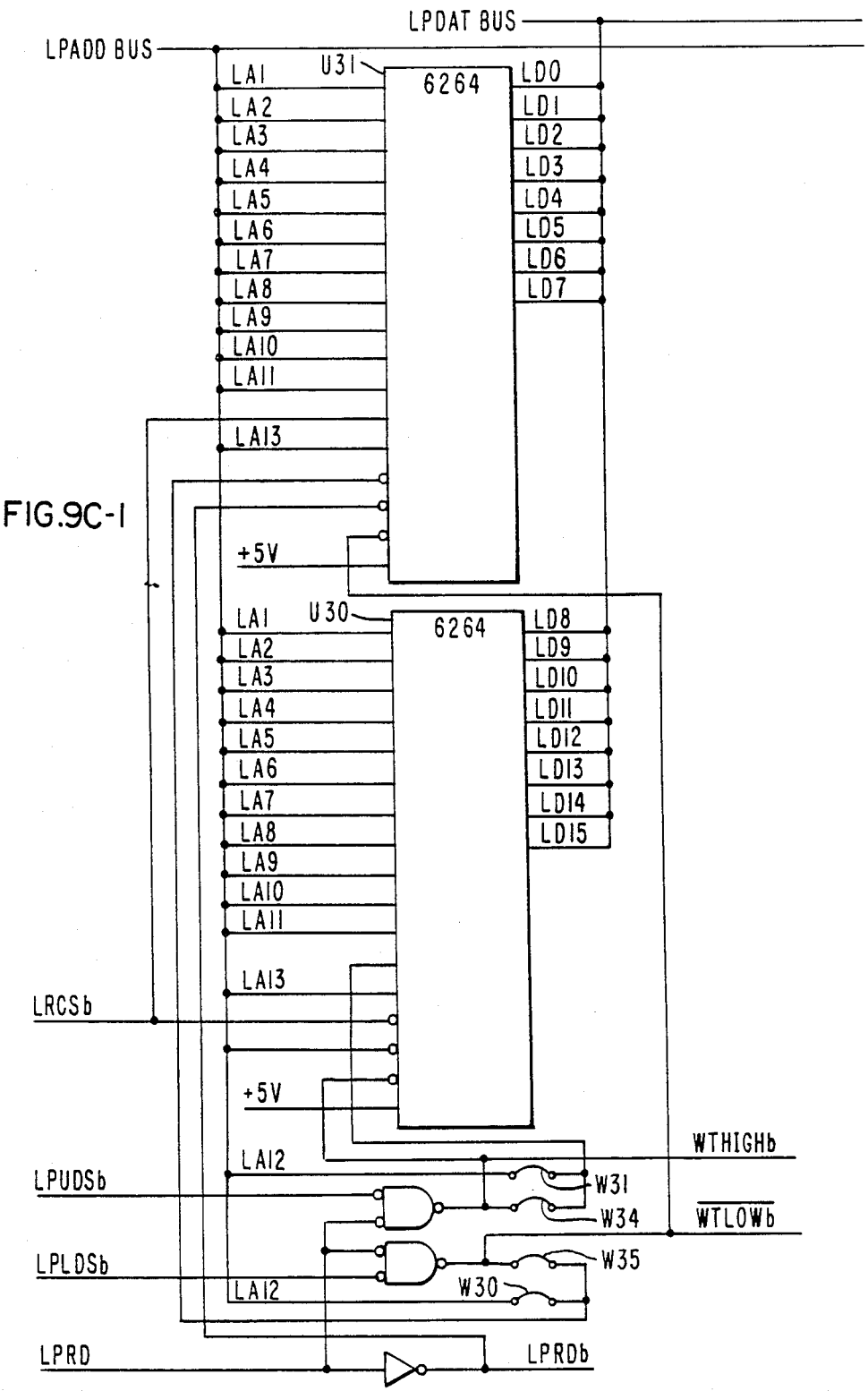
Figures 2, 9C:
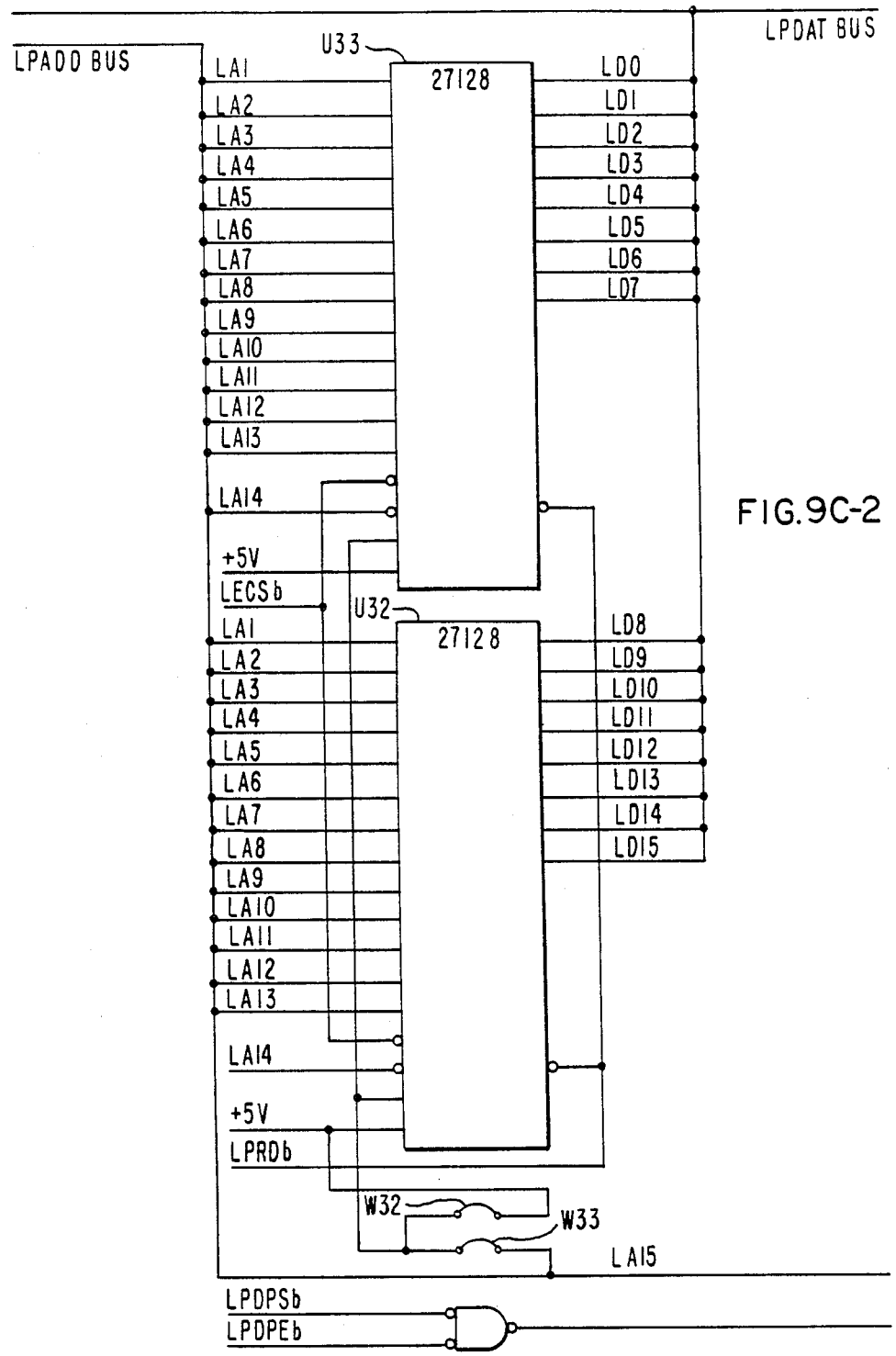
Figures 3, 9C:
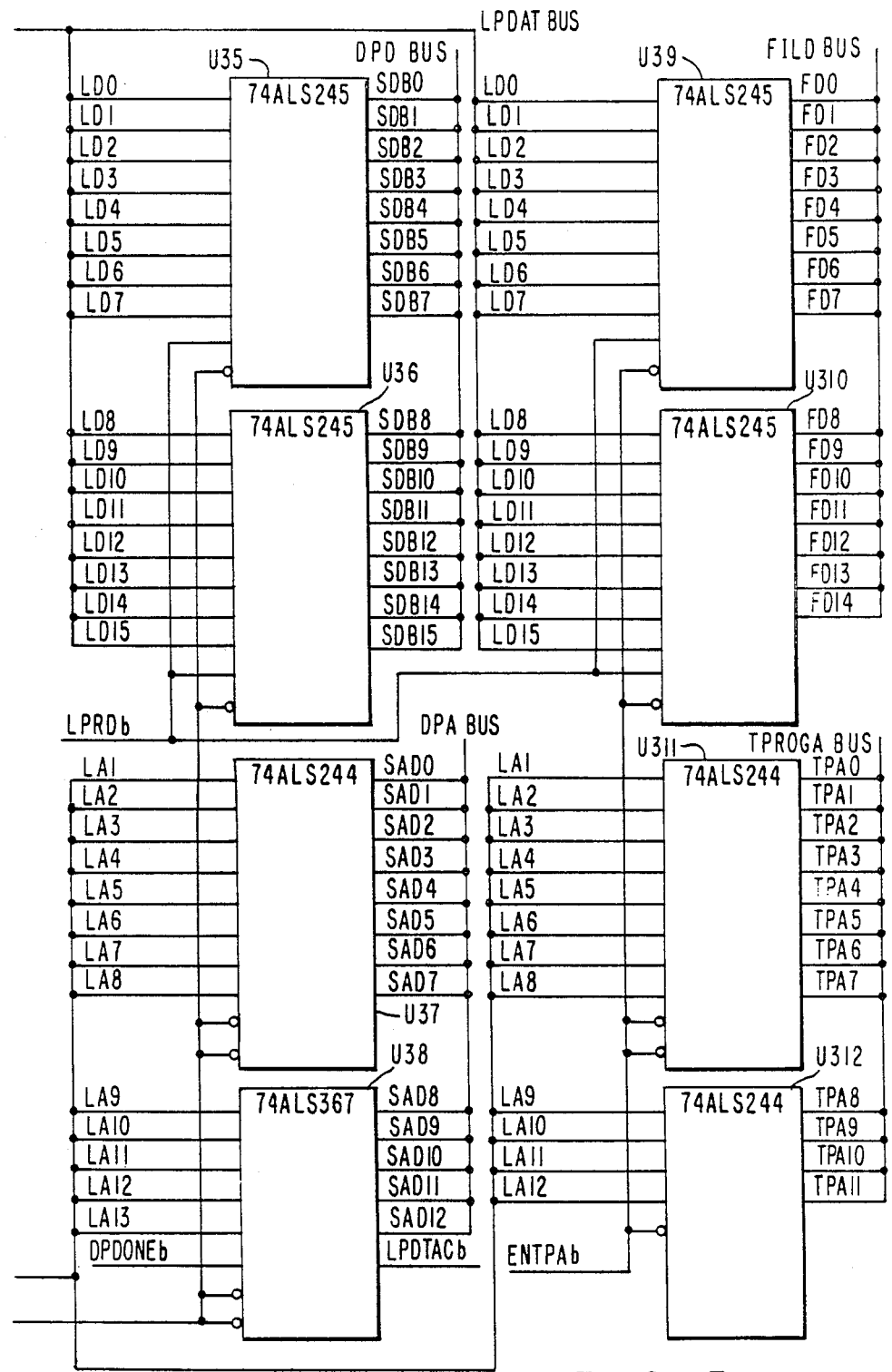

Circuitry associated with the local processor is shown in FIGS. 9B-1 and 9B-2. This circuitry consists of the local processor U26, the clock generator Y20, U20, interrupt encoding U22, local processor device selection U27, DTAC signal generation U28, and local processor bus transfer time out U23. A 20 MHz oscillator Y20 is used to generate the master clock. This frequency is divided by two by U20 which results in generation of the 10 MHz local processor clock signal. The gates associated with U21 are provided for manufacturing test purposes. Pin 2 of U21 can be grounded by a test probe to disable the oscillator. An external frequency can then be injected on pins 3 and 4 of U21 for testing purposes.

Circuitry associated with device U9 comprise the local processor reset function. The high asserted signal RESIN, received from the VME bus, forces both RESETb and HALTb signals to the device U26 which is a Motorola 68000 to be asserted. This condition forces the 68000 to execute the reset vector. The 68000 reset signal pin is bidirectional. Execution of a reset instruction by the 68000 will force the RESETb signal to be asserted without assertion of the HALTb signal. This condition permits the 68000 to reset the remainder of the torque processor module circuitry without itself being reset. Implementation of this function requires U9 to be an open collector device.

Local processor device selection is provided by device U27. This device has inputs consisting of local processor address bus bits 23 through 14, and the LICYLb signal. The LICYLb signal being asserted indicates that an interrupt acknowledge cycle is being executed by the 68000. Assertion of this signal prevents assertion of any of the outputs of U27. Execution of an interrupt acknowledge cycle is indicated by 68000 function lines, FC2-FC0, being in the all ones state. This condition is decoded by U21, the third section of which is shown in FIG. 9B-2, to generate the LICYLb signal. The following provides a listing of local processor address to device selection:

---

000000 to 007FFE LECSb Local Processor EPROM
03800 to 03BFFE LRCSb Local Processor RAM 034000
to 037FFE LPDPSb Local Processor Dual-Port 03C000
to 02C7FE LTBSELb Local Processor TMS Bank Memory
040000 to 041FFE LTPSELb Local Processor TMS Prog
Memory 800000 to 803FFE LIOBSb VMX Bus 07Exxx

| | |
|---|---|
| LIOENb | Local Processor I/O. |

Device U28 is associated with generation of the local processor DTACb signal. This device will cause the DTACb signal to be asserted for selection of devices which within their own control do not assert the DTACb signal. This includes the dual-port memory and the MVX bus interface. It is to be also noted that U28 also provides for DTACb signal timimg required for insertion of the proper number of wait states associated with the selected devices. Presently, all devices with the exception of the local EPROM require zero wait states, and the EPROM requires one wait state. Device U27 has one additional input in addition to the device selection signal lines. This signal, FRESb is used to provide indication that the TMS-320 is being held in the reset condition. This signal is used by U27 to prevent assertion of the DTACb signal if an attempt is made to access the TMS-320 program memory without the TMS-320 being held reset. Under these conditions, the LPBERb signal will be asserted which will cause execution of the bus error exception vector. Device U23 provides for generation of the local processor bus error signal. This device is clocked by the E clock signal, approximately 1 mHz, generated by the 68000. The shift register is reset by local processor address strobe signal being non-asserted. Assertion of LPASb allows a "1" to be shifted through the shift register. If LPASb remains asserted for more than 5 microseconds, indicating that DTACb has not been asserted, the LPBERb signal will be asserted.

Device U22 provides the interrupt controller for the 68000. This device receives the interrupt request lines, and encodes these lines to produce the prioritized interrupt request for the 68000. The following indicates the presently implemented interrupts and associated priority levels. It is to be noted that level 7 is the highest priority interrupt.

| Signal | Priority | Function |
|---|---|---|
| LPNMIb | 7 | Non-Maskable Interrupt |
| ARMERRb | 7 | Arm Interface Module Error |
| PWMINTb | 6 | PWM Device Sample Time |
| LESMPb | 5 | Encoder Sample Time |
| VTINTb | 4 | VME Bus Tick |
| ENCINTb | 3 | Encoder Index |
| ARMINTb | 2 | General Purpose Arm Interface |

The prioritized interrupt request are reflected on pins 17 through 15 of device U22, which are connected to the 68000 interrupt request inputs, signals IPL0b through IPL2b respectively. Interrupt processing by the 68000 can be either vectored or auto-vectored. The distinction between vectored or auto-vectored is determined by the state of the 68000 valid peripheral address signal, VPAb, when the interrupt acknowledge cycle is executed. Assertion of VPA6 indicates that the interrupt vector is to be obtained from the 68000 auto vector table. If VPAb is not asserted in the interrupt acknowledge cycle, the 68000 will input the state of data bus bits 0 through 7, shift this value two places to the left, and use the resulting number for exception table entry. Presently, all interrupts are auto-vectored. The other inputs to the interrupt controller PAL device U22 consist of local processor address bits 1 through 3, and the interrupt acknowledge signal. During the interrupt acknowledge cycle, the local processor address signal lines indicate the interrupt level being acknowledged. These signal lines are decoded to generate the specific interrupt acknowledge signal. The only interrupt request for which a specific interrupt acknowledge signal is generated is the VME bus tick interrupt, VTACKb. All other interrupts require some specific action to be performed in the interrupt routine provide indication of interrupt acknowledgement.

LOCAL MEMORY

The local processor memory shown in FIGS. 9C-1 and 9C-2 consists of four sockets. Two of which are associated with EPROM, U32 and U33, and two of which are associated with RAM, U30 and U31. Circuitry associated with these devices is shown in FIGS. 9C-1 and 9C-2 of the drawings. The EPROM can be implemented with either 27128 or 27256 devices. Jumpers W32 and W33 are associated with EPROM device type usage. Jumper W32 must be installed with usage of 27128 devices and correspondingly, jumper W33 must be installed with usage of 27256 devices. The RAM can be implemented with either 2K by 8-bit or 8K by 8-bit devices. Jumpers W30, W31, W34 and W35 are associated with RAM device type usage. Jumpers W30 and W34 must be installed with usage of 8K by 8-bit devices, and correspondingly, jumpers W31 and W35 must be installed with usage of 2K by 8-bit devices.

TMS 320

Figures 1, 9D:
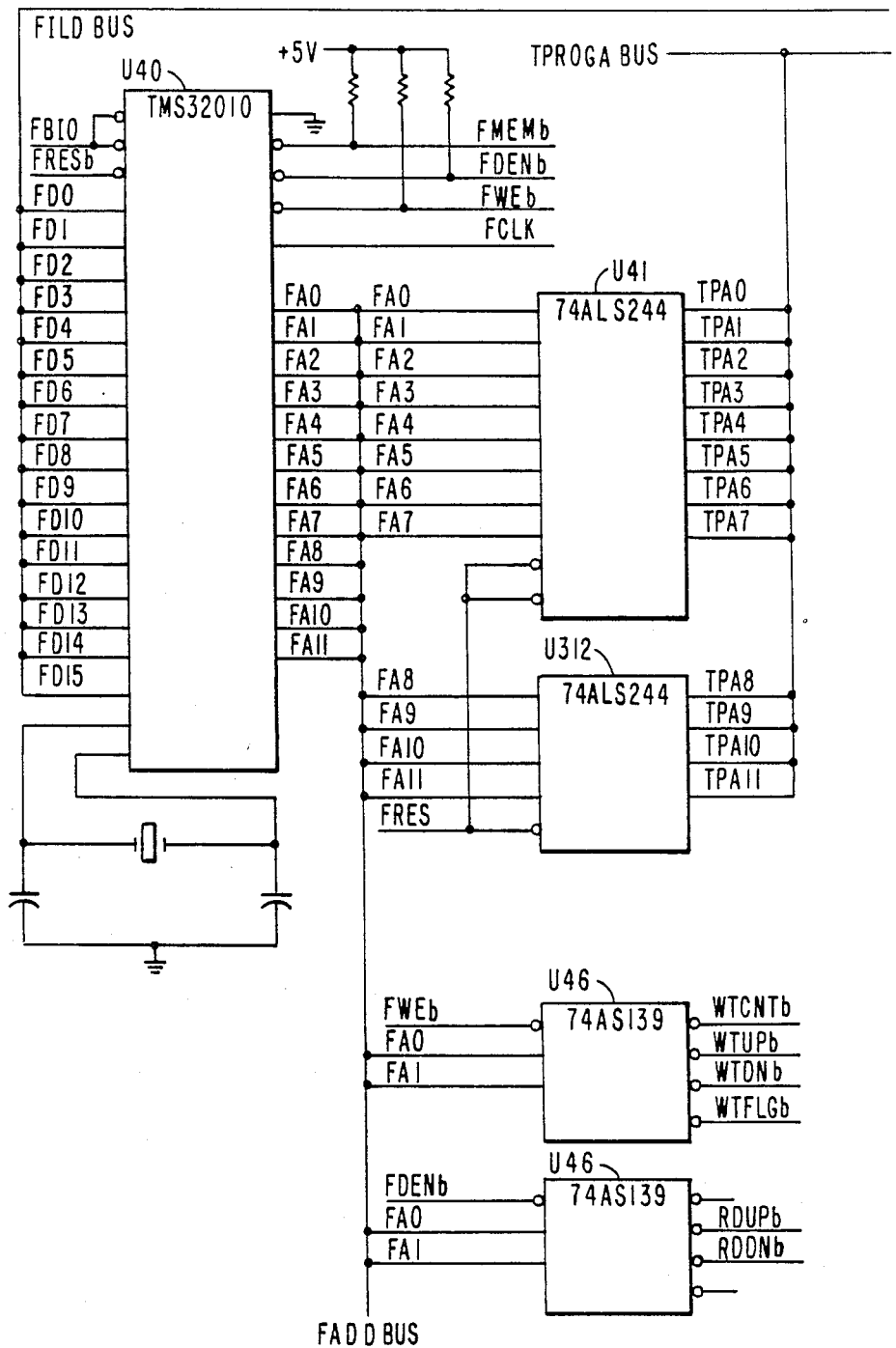

The external interface capability of the TMS 320 or U40 in FIG. 9D-1 reflects the fact that the device was primarily intended to be used in stand alone applications. The TMS 320 is time efficient at performing computational operations; however operation cannot be suspended to allow it access to slower peripheral circuitry. As such, usage of the device in a coprocessor application requires specialized interface circuitry. This interface circuitry provides the capability for the 68000 to load the program memory of the TMS 320, and provides a facility for interchange of information between the TMS 320 and the 68000. Access to the TMS 320 program memory by the 68000 requires the TMS 320 be in the reset condition, that is the TMS 320 reset input must be asserted. The state of the TMS 320 reset signal, FRESb is directly controllable as a latched output from the 68000.

The primary interface for interchange of information between the TMS 320 and the 68000 is provided by implementation of a concept referred to as bank switched memory. The bank switched memory consists of two identical, physically separate, 1K by 16-bit RAM arrays. These arrays are referred to as banks. Both banks are resident within the same address space. At any given point in time, ownership of one of the memory banks is associated with the 68000 and ownership of the other bank is associated with the TMS 320. Since the memory appears as a single 1K by 16-bit RAM, access to the memory by either processor is totally transparent to operations by the other processor. This provides for simultaneous access to the interface memory by both processors. Control and handshake signals are associated with switching of the bank ownership.

There are four states associated with the 68000 to TMS 320 interface. These states are referred to as idle, go, processing and done. Assertion of the TMS 320 reset signal forces the interface to be in the idle state. The interface will remain in the idle state until the go state is requested by the 68000. It is to be noted that bank switching can only be effected while the interface is in the idle state. A request for bank switching, at any other time will not be performed until the idle state is reached.

In operation, the 68000 will write information consisting of commands and data in the bank memory, request a bank switch, and set the go state. Switching of the banks makes this information available to the TMS 320. The TMS 320 detects the go state, sets the processing state, and operates on the data, writing the results back into the bank memory. Concurrently, the 68000 can write the bank memory with the next set of commands and data transparent to the TMS 320 operation. The TMS 320 will set the done state upon completion of the required processing. The 68000 detects the done state, forces the idle state, and switches the banks to obtain access to the results the TMS 320 calculations.

The bank switch memory appears as I/O locations to the TMS 320. Circuitry external to the TMS 320 is required for efficient usage of this memory by the TMS 320 because of the limited I/O ports provided by the TMS 320. Four TMS 320 I/O ports are associated with the bank switch memory and handshake flags. Access to the memory by the TMS 320 is provided by a binary up/down counter. The counter is operated in a post-decrement or post-increment mode. Execution of an output to I/O port 0 will result in the counter being loaded with the data value being output. This will then serve as the bank memory address for the next bank memory. Operations on I/O port 1 will result in either reading or writing of the bank memory with a post-increment of the memory address. Operations on I/O port 2 will result in either reading or writing of the bank memory with a post-decrement of the memory address. Thus, the memory address counter need only be preset to an address at the beginning of a series of read or write operations. Successive I/O operations on I/O ports 1 or 2 will result in access to successive memory locations.

The TMS 320 BIOb pin and I/O port 3 are associated with the handshake interface with the 68000. The 68000 request the GO state by outputting a XXX1 to address 7EA07. This forces the TMS 320 BIOb signal pin the logical "1". The TMS 320 acknowledges by setting the PROCESSING state. The PROCESSING state is set by the TMS outputting a data value of XXX1 to I/O port 3. After completion of the required processing the TMS 320 sets the DONE sate by outputting a XXX2 to I/O port 3. The 68000 then forces the IDLE state by outputting a XXX0 to address 7EA07. Indication of the IDLE state is reflected by the BIOb signal pin being at a logical "0".

Circuitry associated with the TMS 320 processor and its program memory is shown in FIGS. 9D-1 and 9D-2. Circuitry shown in FIGS. 9E-1, 9E-2 and 9F-1, 9F-2 is associated with the bank switch memory. Circuitry shown in FIGS. 9G-1, 9G-2 is primarily associated with bank memory addressing and bank switch control.

The TMS 320 program memory, 4K by 16-bits, is implemented with static high speed, access time of 70 nanoseconds or less, RAM provided by devices U42 through U45 as shown in FIG. 9D-2. Contents of this memory must be downloaded by the 68000 before the TMS can be allowed to begin program execution. Access to the TMS 320 program memory by the 68000 is only allowed when the TMS 320 is being held reset. The 68000 can force the TMS 320 to be reset by writing a 0 to location 7EA01 will release the reset to the TMS 320.

Assertion of the FRESb signal to the TMS 320 will force the TMS 320 to be reset. During reset, the TMS 320 will force its data and control lines to the tri-state condition. However, the address lines are not tri-stated. Therefore, address buffers, devices U41 and U312 in FIG. 9D-1 are required to permit access to the program memory by the 68000. The TMS 320 provides three signals for external indication of the operation being performed. These signals are FMEMb, which is asserted for indication of a program memory read operation; FDENb, which is asserted for indication of a I/O read operation; and FWEb, which is asserted for indication of either a program memory or I/O write operation. It is to be noted that circuitry external to the TMS 320 on the torque processor module does not support the TMS 320 Table write instruction implementation. As such, the TMS 320 cannot write into its program memory. The memory devices used for implementation of the TMS 320 program memory include two input control signals, write enable, WEb, and chip select, CSb, which are not specifically shown. A memory read operation is performed by assertion of the CSb signal with the WEb signal non-asserted. A memory write operation is performed by assertion of both control signals. It is to be noted these devices do not provide an output enable signal. Therefore, assertion of CSb and WEb during memory write operations must be essentially coincident in order to prevent data bus contention between the memory devices and the data bus drivers.

The circuitry shown in FIG. 9D-2 consisting of U47, U313, and U34 provides control signal interface to the TMS 320 program memory. This circuitry multiplexes the memory control signals between either the 68000 or the TMS 320, depending on the state of the TMS 320 reset signal, FRESb. Byte operations from the 68000 are supported. The signal ENTPAb is asserted provided the 68000 is attempting to access the TMS 320 program memory and the TMS 320 is reset. This signal being asserted in FIGS. 9G-1 and 9G-2 allows the 68000 write high, WTHIGHb, and write low, WTLOWb, signals to be gated to the write enable inputs of the respective bytes of TMS 320 program memory. Assertion of ENTPAb shown in FIG. 9D-2 also allows the 68000 data strobe signals, LPUDSb and LPLDSb to be gated to the chip enable inputs of the respective bytes of TMS 320 program memory.

The TMS 320 provides for implementation of eight I/O ports. The torque processor module implementation utilizes four of these I/O ports for operations related to the bank memory. No attempt is made to fully decode the I/O port addresses. As such, the four unused ports overlap the four used ports. That is, for example, TMS 320 operations on I/O port 0 or I/O port 4 will result in the same function being performed. Device U46, shown in FIG. 9D-1 of the drawings, is used to provide decoding of the TMS 320 port address for I/O operations. This device decodes the TMS 320 least significant two address signal lines to provide the decoded bank memory related control signals.

Figures 2, 9E:
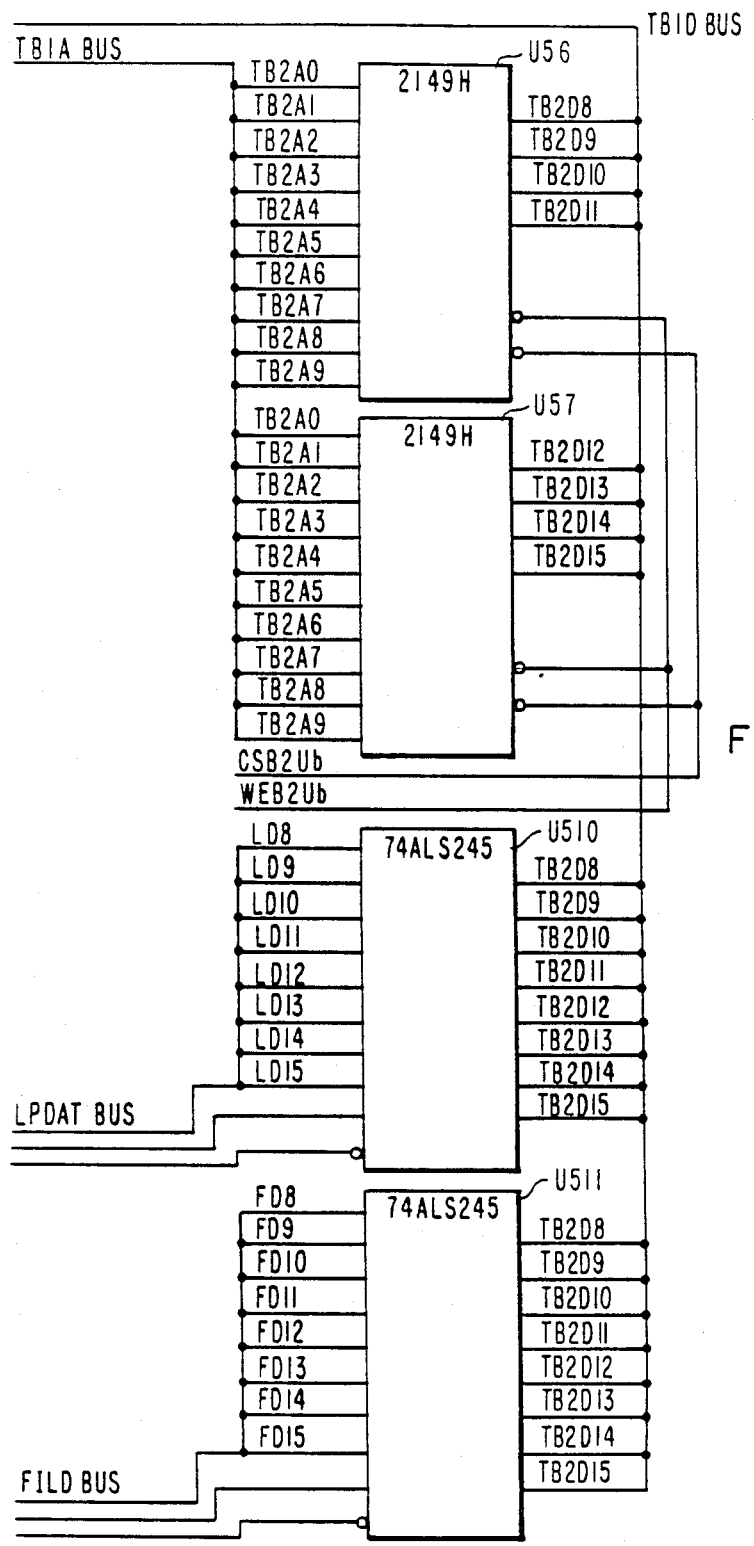
Figures 1, 9F:
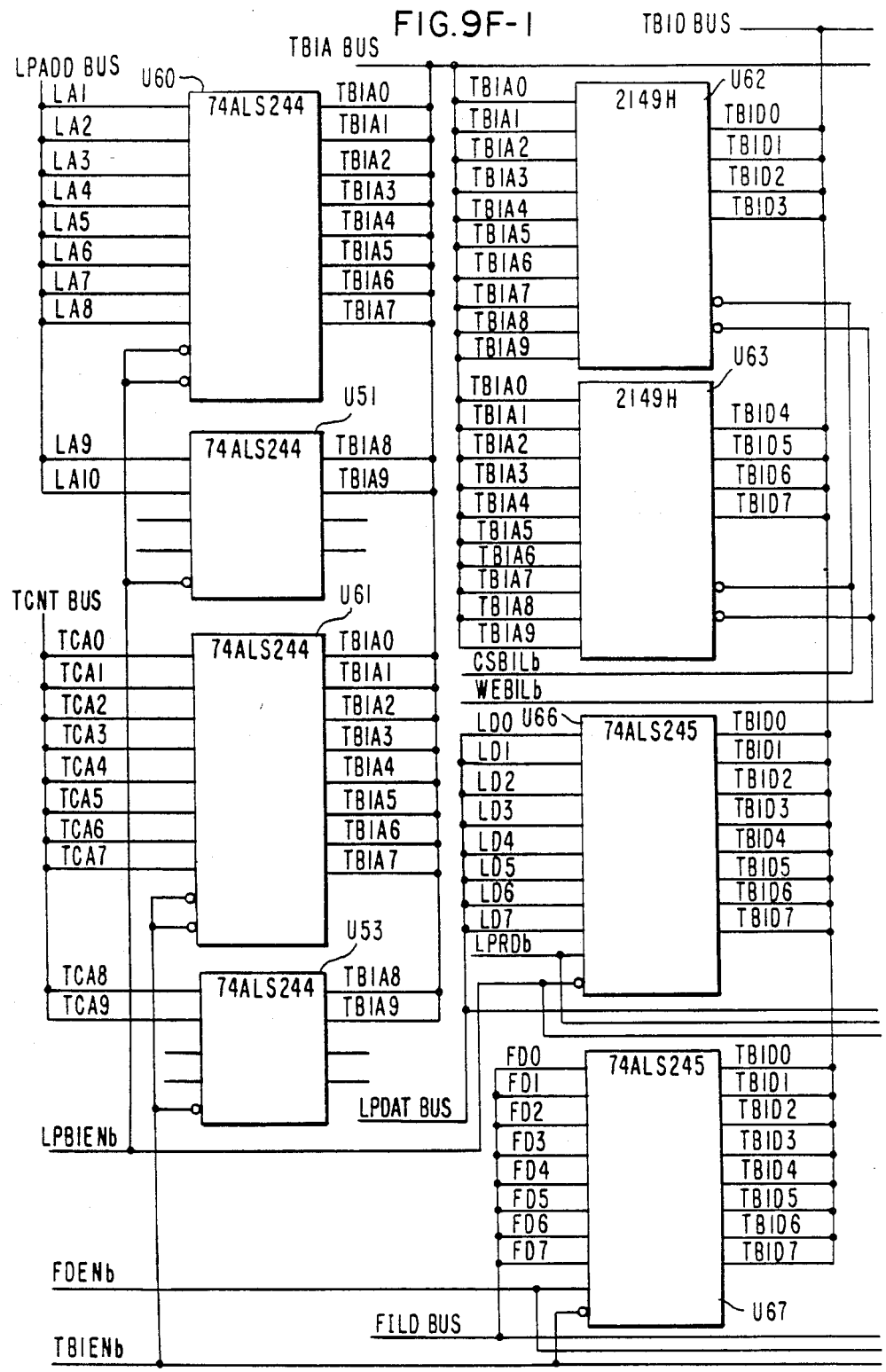
Figures 2, 9F:
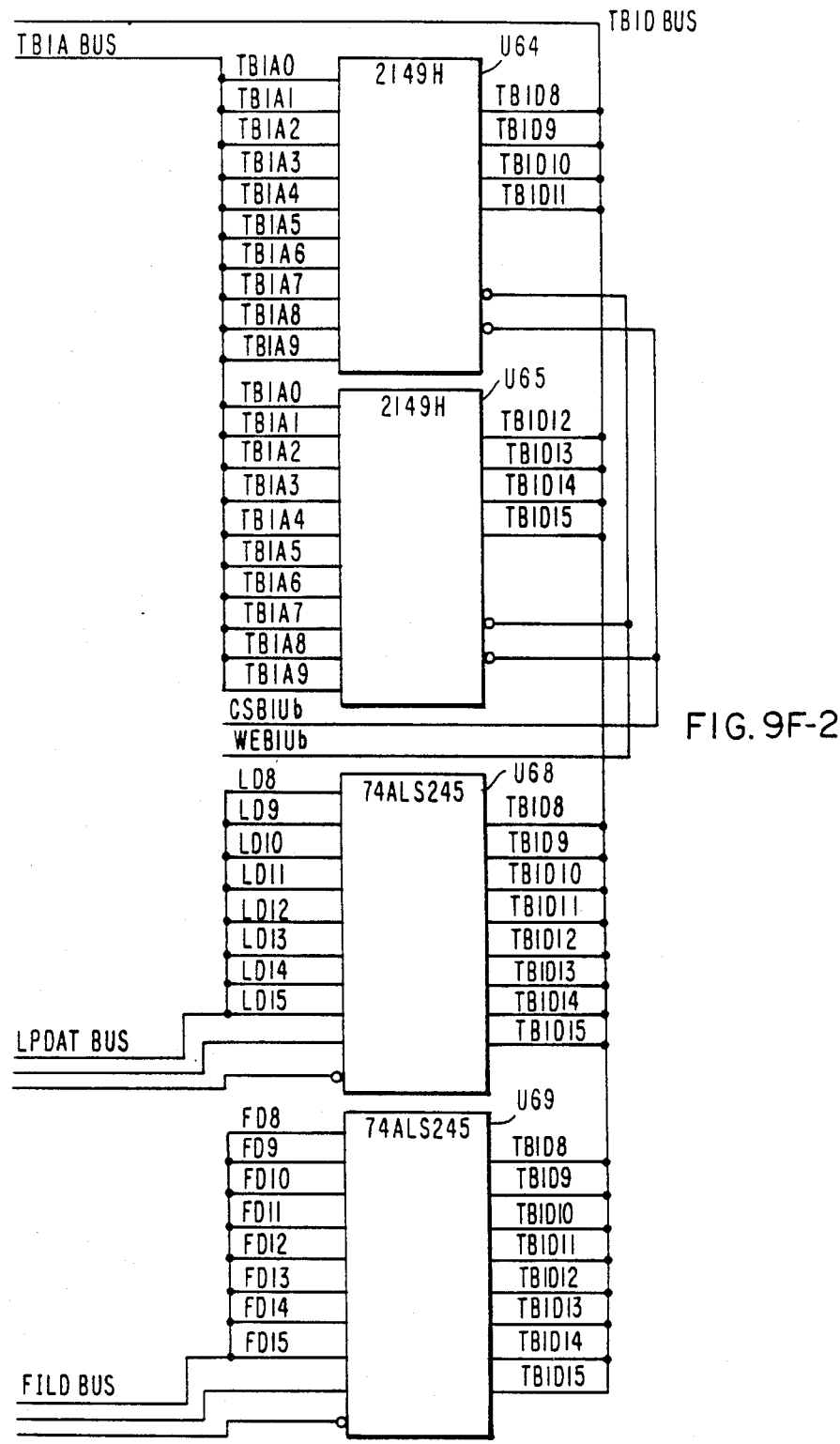
Figures 1, 9G:
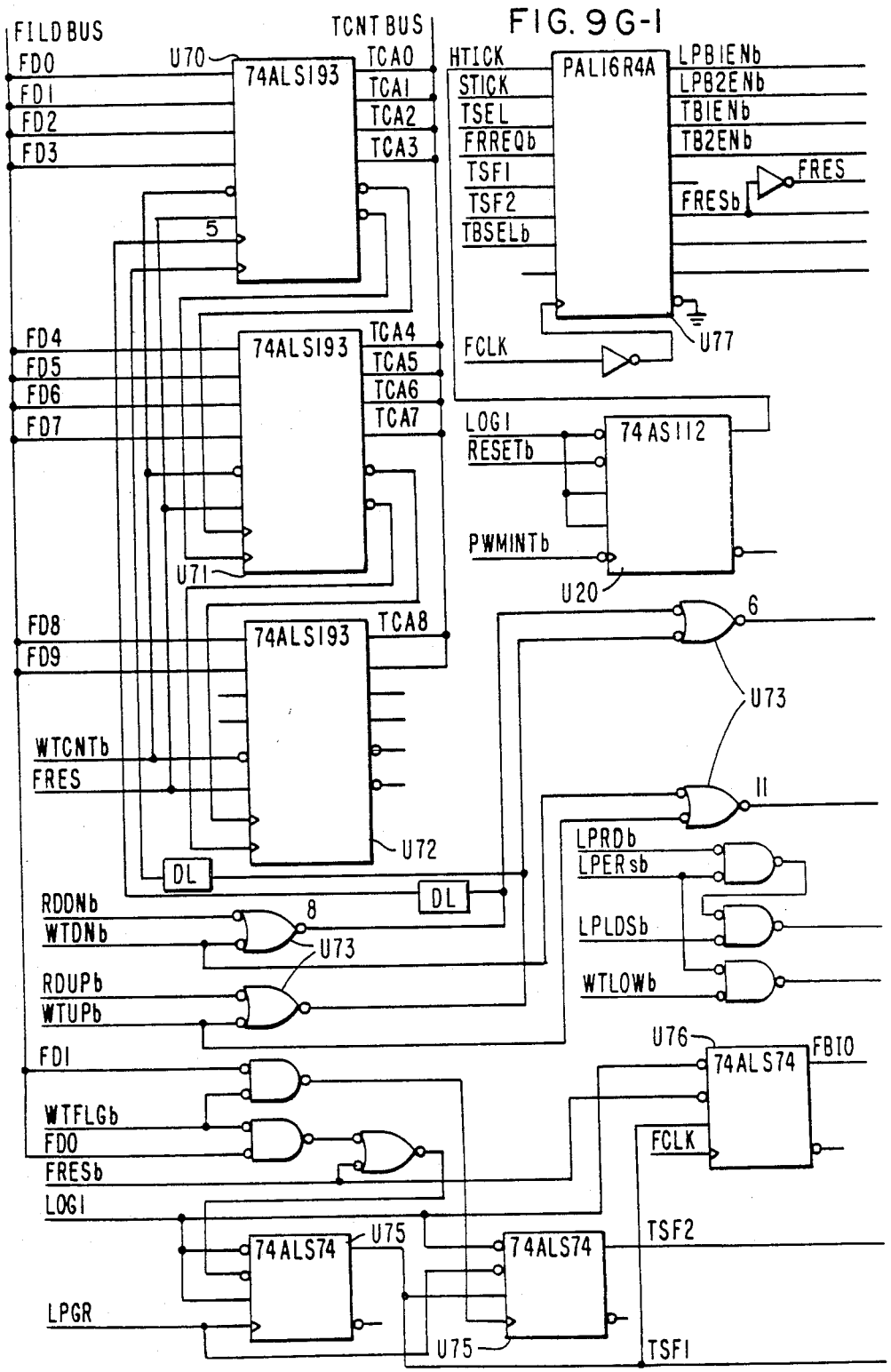
Figures 2, 9G:
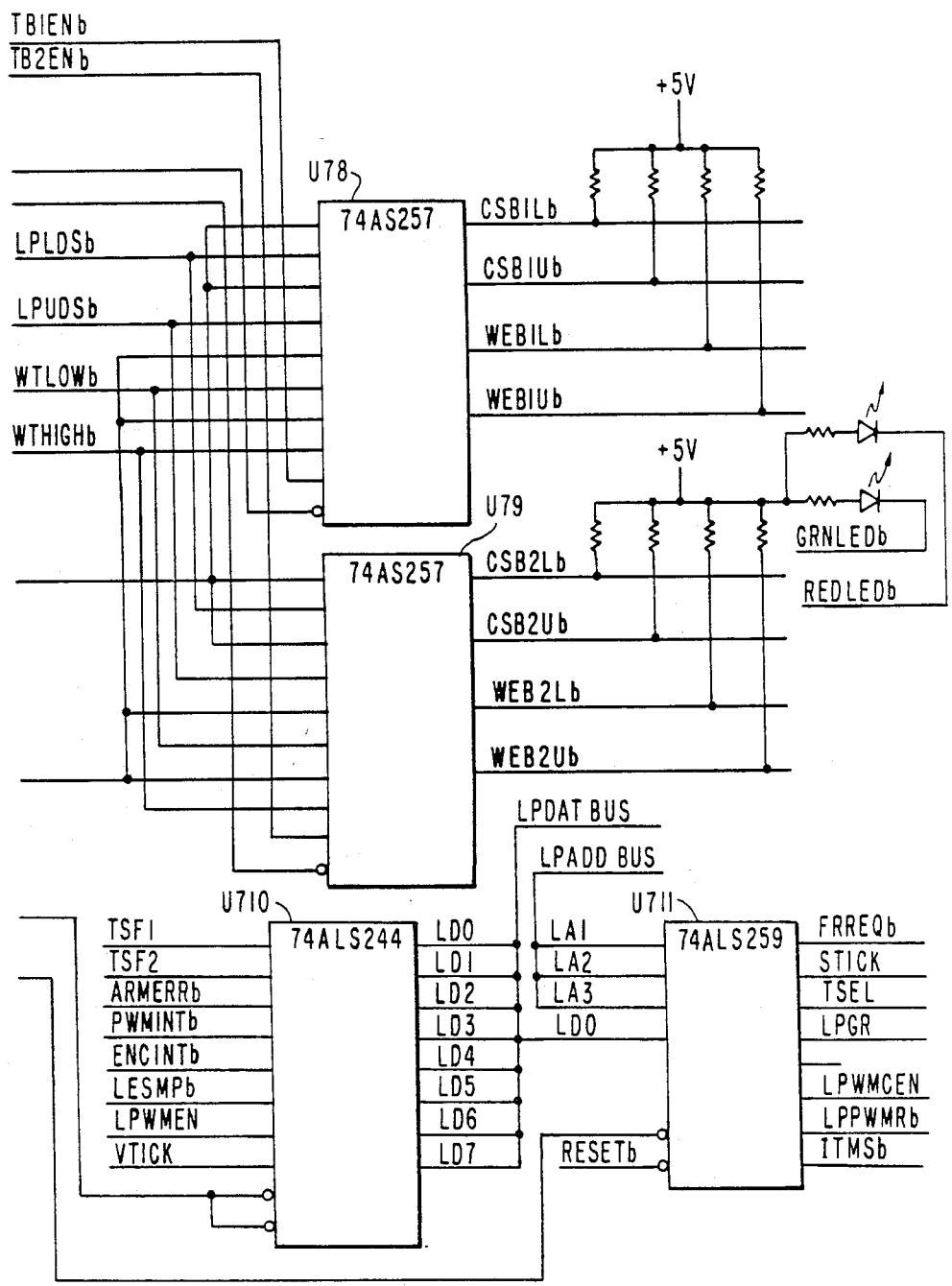

One portion of the bank memory is shown in FIGS. 9E-1 and 9E-2 and control signal and bank switch logic is shown in FIG. 9E-2. The circuitry shown in FIGS. 9F-1 and 9F-2 is essentially identical. Therefore, a description will only be given for the circuitry shown in FIG. 9E-1. Devices U50, U51, U52 and U53 provide for bank memory address signal line multiplexing. Devices U50 and U51 are associated with the 68000, and devices U52 and U53 are associated with the TMS 320. Inputs to the 68000 address multiplexer consist of the 68000 address signal lines LA1 through LA10, and inputs to the TMS 320 multiplexer consist of the outputs of the bank memory address counter U70, U71, U72 shown in FIG. 9G-1. Devices U58, U510, U59, and U511 provide for bank memory data signal line multiplexing. Devices U58 and U510 are associated with the 68000, and devices U59 and U511 are associated with the TMS 320. Word and byte operations for 68000 related access to the bank memory are supported. Generation of multiplexer enable control signals is provided by the bank switch control PAL, U77, shown in FIG. 9G-1. The TMS 320 related multiplexer enable signal, TB1ENb, is asserted whenever the TMS 320 has ownership of the bank. The 68000 related multiplexer enable signal, LPB1ENb is only asserted when the 68000 has ownership of the bank and access to this memory by the 68000 is being attempted. A similar arrangement of the second portion of the bank memory is shown in FIGS. 11F-1 and 11F-2.

The bank switch control logic shown in FIGS. 11G-1 and 11G-2 for the ping-pong memory consists of the bank switch control PAL, device U77, and the bank memory control signal multiplexers, devices U78 and U79. The bank switch logic supports two possible sources for determining bank switching. These two sources are referred to as hard tick and soft tick. The hard tick signal is derived from hardware on a fixed time basis. In the case of the torque processor module, this signal is derived by dividing the PWM ramp frequency by two. The soft tick, STICK, is derived from software. The signal TSEL in FIG. 11G-1 is used to select between the hard and soft tick for determination of bank selection. TSEL is output controllable by the 68000. This signal being in the logical "0" state selects the STICK signal for bank switch selection. STICK being in the logical "0" state selects bank 1, circuitry shown in FIGS. 9E-1 and 9E-2 for ownership by the 68000. The state of TSEL is determined by the state of data bit 0 when a write operation is performed to location 7EA05, and the state of STICK is determined by the state of data bit 0 when a write operation is performed to location 7EA05. The presently intended applications of the torque processor module use the STICK signal for bank memory selection. The other inputs to the bank switch control PAL device U77 consist of the 68000 bank memory select signal, TBSELb, and the interface handshake flags, TSF1 and TSF2. TSF1 and TSF2 are used by the bank switch control to effect bank switching only when the interface is in the IDEL idle state.

The outputs of device U77 consist of 68000 data and address signal line multiplexer enable signals, LPB1ENb and LPB2ENb; TMS 320 data and address signal multiplexer enable signals, TB1ENb and TB2ENb; and the bank memory control signal multiplexer enable signal lines, derived. The signals TB1ENb and TB2ENb are also used to select the source for the bank memory control signals. Switching of the control lines for the bank memory during the bank switch operation requires a special sequence in order to ensure that the outputs of U78 and U79 in FIG. 9G-2 remain in the non-asserted state during the switching operation. This special sequence is as follows. First, both signal lines TB1ENb and TB2ENb are asserted, so that the TMS 320 related control signals are multiplexed to the bank memory control signals. Then the bank memory control signal multiplexer enable signals, are non-asserted, forcing the outputs of U78 and U79 to the tri-state condition. Then either TB1ENb or TB2ENb, according to corresponding new ownership of the bank memory by the 68000 as determined by the state of the selected tick signal, is non-asserted. This is then followed by assertion of the appropriate control signal multiplexer enable signal. The TMS 320 data and address multiplexer enable signal and memory control signal remain asserted until the next bank switch operation. The 68000 related data, address and memory control multiplexer enable signals only become asserted when the 68000 is requisition access to the bank memory.

Device U73 is used to generate the TMS 320 bank memory control signals. Pin 6 of U73 will be asserted whenever a TMS 320 bank memory read or write operation is performed. Pin 11 of U73 will be asserted whenever a TMS 320 bank memory write operation is performed. These signal lines are then multiplexed to the appropriate bank memory chip select and write enable signals by U78 or U79.

The bank memory address counter consists of devices U70 through U72. Assertion of the FRESb signal resets the counter. TMS 320 output on I/O port 0 or 4 forces WTCNTb to be asserted which forces the counter to be parallel loaded with the data value being output. Input or output on I/O ports 1 or 5 will result in reading or writing of data to or from the appropriate bank memory. This will force pin 8 of U73 to be asserted. Completion of the read operation will then force U73 pin 8 to be non-asserted, which will result in the address counter being incremented by one. The delay line in FIG. 9G-1 inserted between U73 pin 8 and U70 pin 5 is required to ensure address hold time requirements for the bank memory are satisfied. In a corresponding sense, input or output on I/O ports 2 or 6 will result in a similar operation with the address counter being decremented.

Device U75 provides for state storage of the interface handshake flags. In the idle state both halves of U75 are reset. The 68000 request the go state by writing a 1 to address 7EA07. This forces the signal LPGR to transition to the logical "1" state, which clocks TSF1 to a logical "1". LPGR being in the logical "1" state also forces the reset signal to TSF2 to be non-asserted. Device U76 provides for synchronization of the FBIO signal with the TMS 320 clock. The TMS 320 sets the processing state by outputting a data value of XXX1 to I/O port 3 or 7. This results in setting TSF2 to a logical "1". The TMS 320 sets the done state by outputting a data value of XXX2 to port 3 or 7. This forces TSF2 to the logical "0" state. The 68000 forces the idle state by writing a 0 to address 7EA07, which forces LPGR to the logical "0" state, resetting TSF1.

Signals TSF1 and TSF2 are also connected to pins 2 and 4 respectively of U710 in FIG. 9G-2. This provides the capability for the state of the interface handshake signals to be monitored by the 68000. A 68000 read from location 7EA01 will result in the data bits 0 and 1 reflecting the state of TSF1 and TSF2 respectively. Device U710 also provides the capability for monitoring other status related signals as follows:

| Signal | Data Bit | Function |
| --- | --- | --- |
| ARMERRb | 2 | Arm interface module error |
| PWMINTb | 3 | PWM sample interrupt state |
| ENCINTb | 4 | Encoder index interrupt state |

| Signal | Data Bit | Function |
| --- | --- | --- |
| LESMPb | 5 | Encoder sample interrupt state |
| LPWMEN | 6 | PWM enable signal state |
| VTICK | 7 | VME bus tick signal state |

Device U711 provides for storage of the TMS 320 control signals. U711 is an eight-bit addressable latch, which provides for implementation of an eight location, single bit, memory element. Assertion of RESETb forces allocations to the logical "0" state. Three additional outputs not previously described are provided by U711. These signals are PWM clock enable, LPWMCEN; PWM reset, LPPWMRb; and a signal which provides the capability for the 68000 to interrupt the TMS 320, ITMSb. An address map for these devices is as follows:

| Address | Signal |
| --- | --- |
| 7EA01 | FRREQb |
| 7EA03 | STICK |
| 7EA05 | TSEL |
| 7EA07 | LPGR |
| 7EA09 | not used |
| 7EA0B | LPWMCEN |
| 7EA0D | LPPWMRb |
| 7EA0F | ITMSb |

EXTERNAL BUS INTERFACE

The torque processor module provides an external bus for interface with arm related devices resident on the arm interface foundation module. This bus is patterned after the VMX bus specifications for timing and signal pin interconnection. Reference is made to this specification for timing information relating to interchange of data through usage of this bus. As implemented, this bus conforms to a subset of the full VMX bus specifications. The areas of difference are as follows:

1. Multiple Masters: The VMX bus provides for multiple bus masters and this functionality is not supported. The torque processor module serves as the only VMX bus master and the arm interface foundation serves as the bus slave.

2. Bus Cycles: The VMX bus provides for several types of bus cycles. Only single cycles of transfer are supported by the torque processor module.

3. Data Transfers: The VMX bus supports longword, i.e., 32-bit transfers. This functionality is not supported.

4. Address Capability: The VMX bus supports 24-bit address definition. This is accomplished through multiplexing the 24 bits of address information onto 12 address signal lines and through usage of two address strobe signals, UASb and LASb (not specifically shown). This functionality is not supported. The torque processor module only provides 12 bits of address information and indication that the address is valid is provided by assertion of the UASb signal line. The LASb signal line is connected to a logical "1".

Figures 1, 9H:
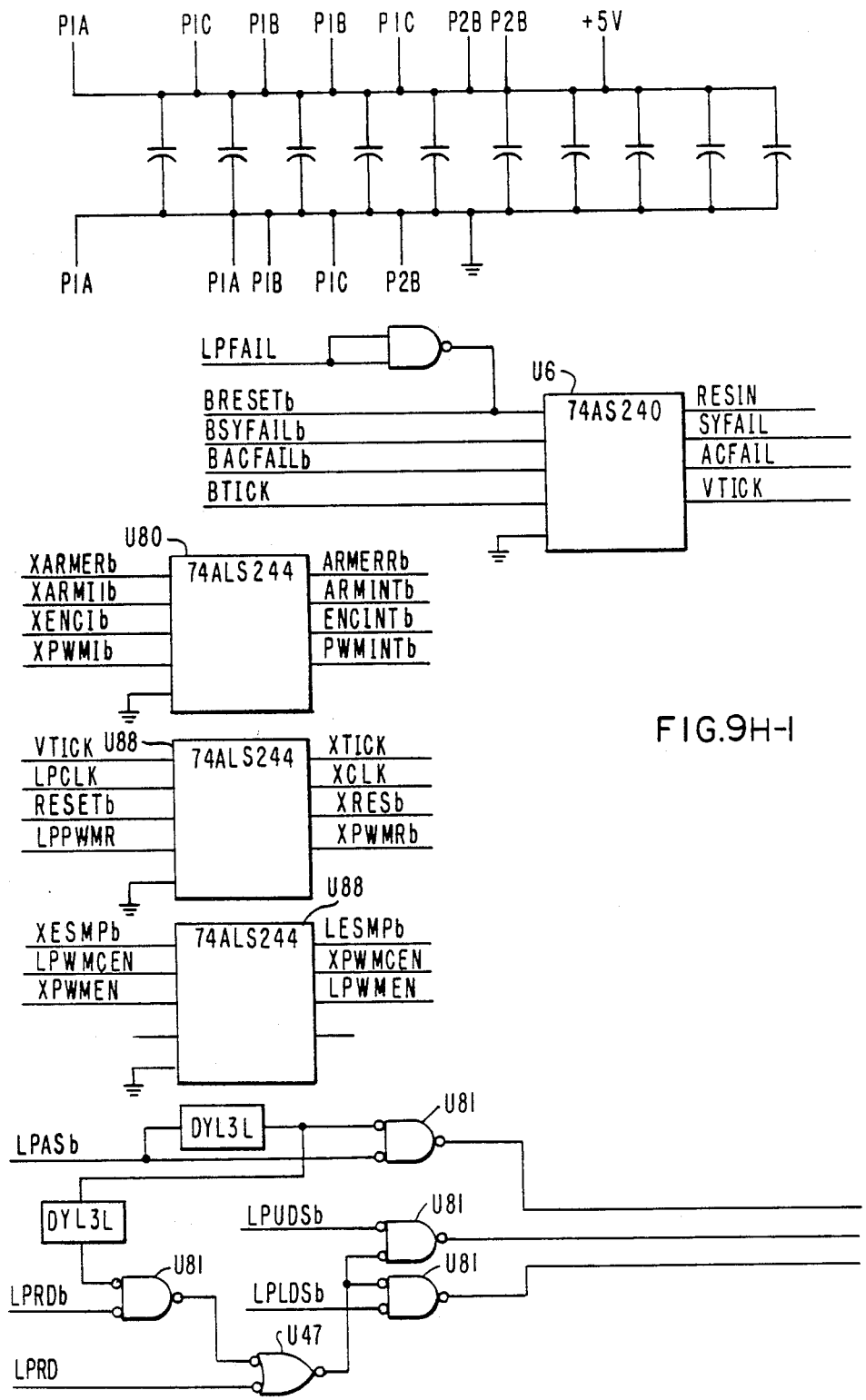
Figures 2, 9H:
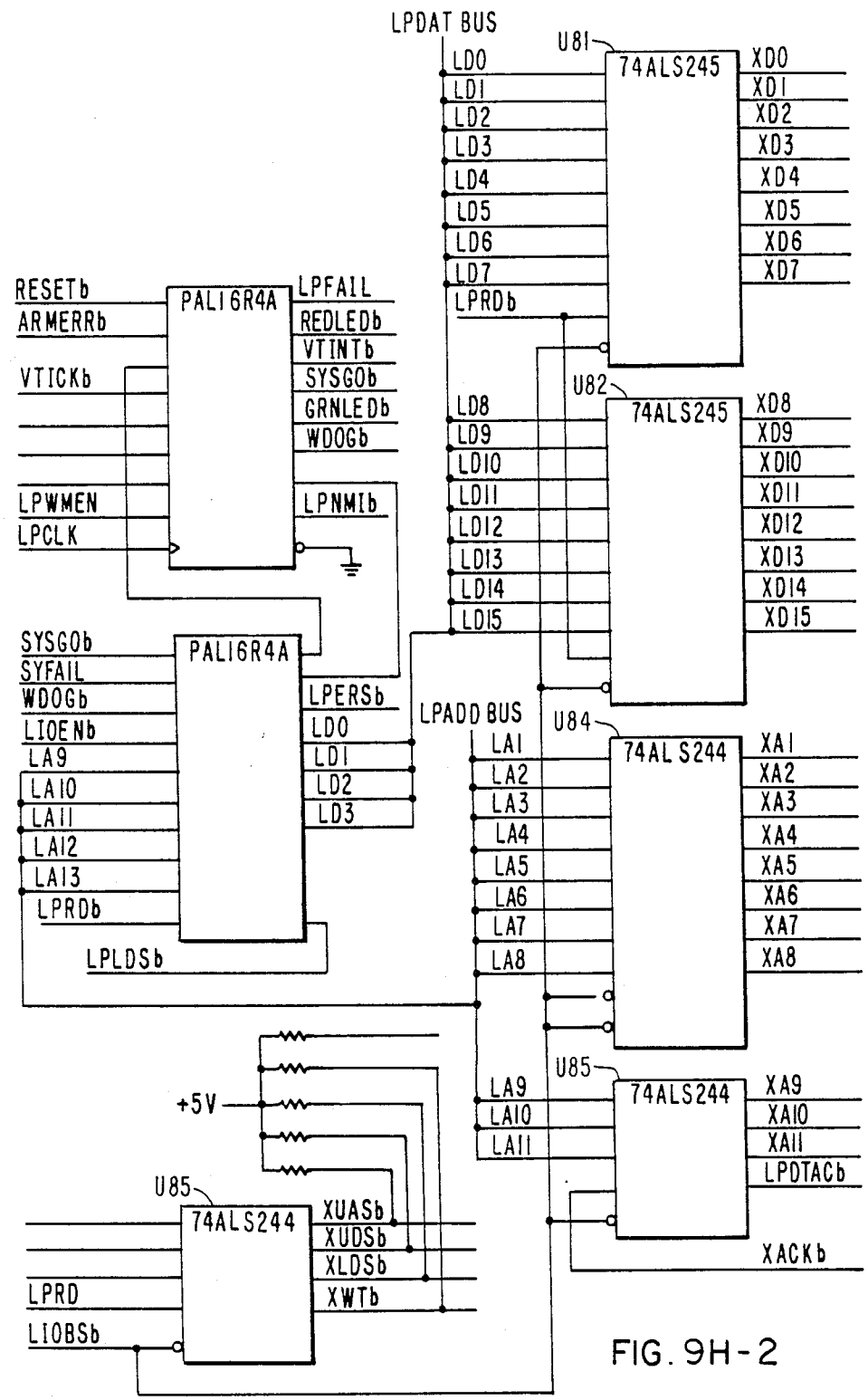

The VMX bus interface circuitry is shown in FIGS. 9H-1 and 9H-2 of the drawings. Devices U82 nd U83 provide the data bus interface. Devices U84 and U85 provide the address bus interface. Control bus interface is provided by U85. The delay line and gates associated with U81 and U47 are necessary to ensure timing specifications for control signals with respect to address and data buses.

What is claimed is:

1. A digitally controlled robot comprising:
an arm having a plurality of joints;
each of said joints being driven by an electric motor drive;
a power amplifier operable to supply drive current to each joint drive motor;
respective feedback control loop means for respectively controlling said power amplifiers for said joint drive motors;
each of said feedback control loop means including at least digital position, velocity and torque control loops operable to control the associated power amplifier;
servo control means for performing control support tasks and calculation tasks for at least said torque control loop for all of the joint motors;
said torque servo control means including a first microprocessor for digitally performing calculation tasks including computing output motor voltage control commands from input torque commands and current feedback and from stored algorithms for said torque control loop for each joint drive motor;
said first microprocessor having a relatively high computing performance capability and a relatively low data processing interface capability;
said torque servo control means further including a second microprocessor for supervising the operation of said torque servo control means and performing servo control support tasks in said torque control loop for each joint drive motor;
said second microprocessor having a relatively high data processing performance capability;
means for interfacing said first and second microprocessors relative to each other and relative to higher and lower level control circuitry so as to enable said torque servo control means to operate said torque control loop for each joint drive motor and provide torque control for each joint drive motor;
said lower level circuitry including respective digital pulse width modulating means for generating joint drive motor control signals for application to said power amplifiers for the respective robot drive axes;
means for sensing motor drive current for each drive axis and for generating corresponding digital current feedback signals;
means for coupling said second microprocessor to higher level control looping to receive torque commands for execution and to send status data;
means for operating said second microprocessor to control said interfacing means so as to send torque commands to said first microprocessor and receive calculated voltage commands from said first microprocessor; and
means for operating said second microprocessor to apply the voltage commands to said pulse width modulating means for execution and for synchronously receiving said motor current feedback signals.

2. A robot as set forth in claim 1 wherein said second microprocessor operating means includes interrupt program means and main program means;

said interrupt program means being executed cyclically at the digital control sampling rate and implementing a plurality of functions including directing the routing of voltage commands from said interfacing means to said pulse width modulating means and directing the routing of motor current feedback signals to said interfacing means and said first microprocessor from said digital generating means;

said main program means operating on start-up to initialize torque servo control microprocessor operation and thereafter operating in a wait command mode to manage synchronized execution of high priority commands received from the next higher control level.

3. A robot as set forth in claim 2 wherein said high priority commands include parameter change commands such as those for synchronizing pulse width modulation to pulse width modulation generation as a function of dynamic operating conditions of the robot arm.

4. A robot as set forth in claim 2 wherein the interrupt program execution rate is at least as fast as a time frame to accommodate the torque bandwidth of the robot system when the robot has at least six axes of motion.

5. A digital control for a robot having a plurality of arm joints each joint being driven about an axis by an electric motor, said control comprising:

a power amplifier operable to supply drive current to each joint motor;

respective feedback control loop means for respectively controlling said power amplifiers for said joint motors;

each of said feedback control loop means including at least digital position, velocity and torque control loops operable to control the associated power amplifier;

servo control means for performing control support tasks and calculation tasks for at least said torque control loop for all of the joint motors;

said first servo control means including a first microprocessor for digitally performing calculation tasks including computing output motor voltage control commands from input torque commands and from stored algorithms for said torque control loop for each joint motor;

said first microprocessor having a relatively high computing performance capability and a relatively low data processing interface capability;

said torque servo control means further including a second microprocessor for supervising the operation of said torque servo control means and performing servo control support tasks in said torque control loop for each joint motor;

means for interfacing said first and second microprocessors relative to each other and relative to higher and lower level control circuitry so as to enable said torque servo control means to operate said one control loop for each joint motor and provide torque control for each joint motor;

said lower level circuitry including respective digital pulse width modulating means for generating joint motor control signals for application to said power amplifiers for the respective robot joint axes;

means for sensing motor current for each joint axis and for generating corresponding digital current feedback signals;

means for coupling said second microprocessor to higher level control looping to receive digital torque commands for execution and to send status data;

means for operating said second microprocessor to control said interfacing means so as to send torque commands to said first microprocessor and receive calculated voltage commands from said first microprocessor; and means for operating said second microprocessor to apply the voltage commands to said pulse width modulating means for execution and to receive said motor current feedback signals in synchronism with torque control loop operation.

6. A digital robot control as set forth in claim 5 wherein said second microprocessor operating means includes interrupt program means and main program means;

said interrupt program means being executed cyclically at the digital control sampling rate and implementing a plurality of functions including directing the routing of voltage commands from said interfacing means to said pulse width modulating means and directing the routing of motor current feedback signals to said interfacing means and said first microprocessor from said digital generating means;

said main program means operating on startup to initialize torque servo control microprocessor operation and thereafter operating in a wait command mode to manage synchronized execution of high priority commands received from the next higher control level.

7. A digital robot control as set forth in claim 5 wherein said high priority commands include parameter change commands as a function of operating conditions.

8. A digital robot control as set forth in claim 5 wherein the interrupt program execution rate is at least as fast as once every 250 microseconds to accommodate the bandwidth of the robot system when the robot has at least six axes.

9. A digital servo control for a robot control system that employs a respective feedback control loop means to control the energization of a respective arm joint motor, with each of the feedback control loop means including at least digital position, velocity and torque control loops; said servo control comprising:

a first microprocessor for performing calculation tasks including computing output motor voltage control commands from input torque commands and motor current feedback and from stored algorithms for said torque control loop for all of the arm joint motors;

said first microprocessor having a relatively high computing performance capability and a relatively low data processing interface capability;

a second microprocessor for supervising the operation of said first microprocessor and performing servo control support tasks in said torque control loop for the respective arm joint motor including the routing of control commands and status and feedback data to and from said first microprocessor;

means for interfacing said first and second microprocessors relative to each other and relative to higher and lower level control circuitry so as to enable said first microprocessor to concurrently operate said digital torque control loop for each arm joint motor;

said lower level circuitry including respective digital pulse width modulating means for generating arm joint motor control signals for application to said power amplifiers for the respective robot axes of arm movement;

mean for sensing motor current for each axis of arm movement and for generating corresponding digital current feedback signals;

means for coupling said second microprocessor to higher level control looping to receive torque commands for execution and to send status data;

means for operating said second microprocessor to control said interfacing means so as to send torque commands to said first microprocessor and receive calculated voltage commands from said first microprocessor; and means for operating said second microprocessor to apply the voltage commands to said pulse width modulating means for execution and to receive said motor current feedback signals.

10. A digital robot control as set forth in claim 5 wherein said first microprocessor has program means for making predetermined checking computations from current feedback values.

* * * * *